US008962778B2

(12) United States Patent
Iji et al.

(10) Patent No.: US 8,962,778 B2
(45) Date of Patent: Feb. 24, 2015

(54) CELLULOSE RESIN AND METHOD FOR PRODUCING THE SAME

(75) Inventors: Masatoshi Iji, Minato-ku (JP); Sungil Moon, Minato-ku (JP); Shukichi Tanaka, Minato-ku (JP); Hiroyuki Kai, Minato-ku (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/500,270

(22) PCT Filed: Oct. 4, 2010

(86) PCT No.: PCT/JP2010/067334
§ 371 (c)(1),
(2), (4) Date: Apr. 4, 2012

(87) PCT Pub. No.: WO2011/043280
PCT Pub. Date: Apr. 14, 2011

(65) Prior Publication Data
US 2012/0196998 A1 Aug. 2, 2012

(30) Foreign Application Priority Data

Oct. 5, 2009 (JP) ................. 2009-231671
Apr. 30, 2010 (JP) ................. 2010-105513

(51) Int. Cl.
C08B 3/16 (2006.01)
C08B 3/10 (2006.01)

(52) U.S. Cl.
CPC .... C08B 3/10 (2013.01); C08B 3/16 (2013.01)
USPC ...................................... 527/303

(58) Field of Classification Search
None
See application file for complete search history.

(56) References Cited

U.S. PATENT DOCUMENTS

| 2,181,119 | A | * | 11/1939 | Caplan | 568/635 |
|---|---|---|---|---|---|
| 2,191,306 | A | * | 2/1940 | Borglin | 530/219 |
| 2,191,307 | A | * | 2/1940 | Borglin | 530/219 |
| 2,224,238 | A | * | 12/1940 | Spitzli et al. | 106/164.43 |
| 2,284,369 | A | * | 5/1942 | Caplan | 568/780 |
| 2,551,282 | A | * | 5/1951 | Palmer et al. | 524/13 |
| 2,786,829 | A | * | 3/1957 | Stevens et al. | 568/16 |
| 4,228,277 | A | * | 10/1980 | Landoll | 536/90 |
| 4,663,159 | A | * | 5/1987 | Brode et al. | 424/70.13 |
| 5,124,445 | A | * | 6/1992 | Just et al. | 536/84 |
| 5,504,123 | A |  | 4/1996 | Partan, III |  |
| 6,229,054 | B1 | * | 5/2001 | Dai et al. | 568/630 |
| 8,450,446 | B2 | * | 5/2013 | Fontana | 528/129 |
| 2004/0210029 | A1 | * | 10/2004 | Fontana | 528/144 |
| 2005/0027043 | A1 |  | 2/2005 | Yao et al. |  |
| 2008/0064852 | A1 |  | 3/2008 | Ddamulira et al. |  |
| 2008/0207863 | A1 | * | 8/2008 | Fontana | 527/602 |

FOREIGN PATENT DOCUMENTS

| CN | 1550523 A | 12/2004 |
|---|---|---|
| JP | 05-086334 A | 4/1993 |
| JP | 06-033395 A | 2/1994 |
| JP | 08-231918 A | 9/1996 |
| JP | 10-008035 A | 1/1998 |
| JP | 11-255801 A | 9/1999 |
| JP | 2001-032869 A | 2/2001 |

OTHER PUBLICATIONS

The separation and synthesis of lipidic 1,2 and 1,3 diols from natural phenolic lipids for the complexation and recovery of boron, Tyman et al., Chemistry and Physics of Lipids, 126 (2003) 177-179.*
Butvar polyvinyl butyral resin, Properites and Uses, Eastman, p. 2, Nov. 2013.*
Grafting of Bio-Monomers, John et al., Polymer Bulletin 22, 89-94 (1989).*
Emmett M. Partain, "The Synthesis of Hydrophobe-Modified Hydroxyethyl Cellulose Polymers Using 3-$_n$-Pentadecenyl Phenyl Glycidyl Ether", Polymer Preprints, 1998, pp. 82-83, vol. 39, No. 2.
Peter Mair, et al., "Cellulose Bound Chlorophenols II: Preparation and Characterization of Phenyloxycarbonylpentanoyl Celluloses Dependence of Substitution on Chlorophenol Structure", Journal of Applied Polymer Science, 1987, pp. 1345-1351, vol. 34, No. 4.
V.A.E. Shaikh, et al., "Thermotropic Behavior of Cholesterol-Linked Polysaccharides", Journal of Applied Polymer Science, 1998, pp. 195-201, vol. 70, No. 1.
George John, et al., "Grafting of bio-monomers, 1. Cationic graft copolymerization of cardanol using boron trifluoride diethyl etherate onto cellulose", Polymer Bulletin, 1989, p. 89-94, vol. 22, No. 1.
Muhammad A. Hussain, Rapid Communication, Unconventional Synthesis and Characterization of Novel Abietic Acid Esters of Hydroxypropylcellulose as Potential Macromolecular Prodrugs, Journal of Polymer Science Part A : Polymer Chemistry, 2008, pp. 747-752, vol. 46.
"Synthesis of CNSL Modified Novalac Phenolic Resin and Properties of its Molding Composite", Xue-mei Liu, et al., China Plastics, vol. 19, No. 11, pp. 70-73, Nov. 2005.
Communication dated Aug. 20, 2014, issue by the State Intellectual Property Office of the People's Republic of China in corresponding Chinese Application No. 201080054974.8.
Office Action, dated Aug. 13, 2013, issued by the State Intellectual Property Office of the People's Republic of China, in counterpart Application No. 201080054974.8.
"Synthesis of CNSL Modified Novalac Phenolic Resin and Properties of its Molding Composite", Xue-mei Liu et al., China Plastics, vol. 19, No. 11, pp. 70-73, Nov. 2005.

* cited by examiner

Primary Examiner — James J Seidleck
Assistant Examiner — Peter A Salamon
(74) Attorney, Agent, or Firm — Sughrue Mion, PLLC

(57) ABSTRACT

A cellulose resin produced by binding cardanol or a derivative thereof and abietic acid or a derivative thereof to cellulose or a derivative thereof.

20 Claims, No Drawings

CELLULOSE RESIN AND METHOD FOR PRODUCING THE SAME

CROSS REFERENCE TO RELATED APPLICATIONS

This application is a National Stage of International Application No. PCT/JP2010/067334 filed Oct. 4, 2010, claiming priority based on Japanese Patent Application Nos. 2009-231671 filed Oct. 5, 2009 and 2010-105513 filed Apr. 30, 2010, the contents of all of which are incorporated herein by reference in their entirety.

TECHNICAL FIELD

The present invention relates to a cellulose resin and a method for producing the same.

BACKGROUND ART

Bioplastic using a plant as a raw material can contribute to a countermeasure against petroleum depletion and global warming, and has been started being used not only in common products such as packaging, containers and fibers but also in durable products such as electronics and automobiles.

However, general bioplastics, such as polylactic acid, polyhydroxyalkanoate and modified starch, all use starch materials, more precisely, edible parts, as raw materials. Accordingly, for fear of future food shortage, it has been desired to develop a novel bioplastic using a non-edible part as a raw material.

As bioplastic using a non-edible part as a raw material, various types of bioplastics using cellulose, which is a main component of non-edible parts of wood and plant, have been already developed and commercialized.

Cellulose is a high molecular weight compound formed by polymerization of β-glucose. Since cellulose has high crystallinity, it is hard, fragile and absent of thermoplasticity. In addition, since cellulose contains many hydroxy groups, water absorbability is high and water resistance is low. Then, various investigations have been made to improve the properties of cellulose.

For example, Patent Literature 1 (JP11-255801A) discloses a biodegradable graft polymer having thermoplasticity obtained by ring-opening graft polymerization of cellulose acetate having a hydroxy group with ε-caprolactone.

Meanwhile, a material using a non-edible component other than cellulose has been developed. For example, cardanol derived from cashew nutshell and rosin derived from pine resins (particularly, abietic acid as a main component), since they have stable amount of production and excellent functionality ascribed to their characteristic molecular structures, have found various applications.

As an example of using cardanol, Patent Literature 2 (JP10-8035A) discloses a friction material for brake, which is formed of a fiber base material made of an aramid pulp and a cellulose fiber, and a filler made of calcium carbonate and cashew dust, with the use of a binder made of a phenol resin. Patent Literature 3 (JP2001-32869A) discloses a friction material formed of a base material made of an aramid fiber and a cellulose fiber, and a filler made of graphite and cashew dust, with the use of an organic-inorganic composite binder. It is described that the friction material is applied to clutch facing of a power transmission system of automobiles etc.

In Non Patent Literature 1 (George John et al., Polymer Bulletin, 22, p. 89-94 (1989)), it is described that water resistance of paper can be improved by soaking a paper sheet in cardanol to perform a grafting reaction through which cardanol binds to cellulose constituting the paper sheet. It is described that, in the grafting reaction, a terminal double bond of cardanol binds to a hydroxy group of cellulose in the presence of boron trifluoride diethyl ether ($BF_3$—$OEt_2$).

Meanwhile, an example of using rosin is disclosed in Patent Literature 4 (JP5-86334A) in which a reaction product obtained by adding purified rosin to α,β-unsaturated monocarboxylic acid and/or an α,β-unsaturated dicarboxylic acid is hydrogenated to obtain a colorless rosin derivative, which is suitable as a pigment coating agent, a sizing agent for manufacturing paper, a flux agent, etc.

Patent Literature 5 (JP6-33395A) discloses that an esterified reaction product obtained by reaction of rosin, a polyol, a polyvalent (trivalent or more) carboxylic acids or an anhydride thereof, and an α,β-unsaturated polybasic acid is used as a sizing agent component.

Non Patent Literature 2 (Muhammad A. Hussain, Journal of Polymer Science: Part A: Polymer Chemistry, 46, p. 747-752 (2008)) describes a hydroxypropyl cellulose derivative to which abietic acid is bound by grafting and that since this derivative has a property of swelling with water and an organic solvent, it is possibly used in sustained-release preparations.

CITATION LIST

Patent Literature

Patent Literature 1: JP11-255801A
Patent Literature 2: JP10-8035A
Patent Literature 3: JP2001-32869A
Patent Literature 4: JP5-86334A
Patent Literature 5: JP6-33395A

Non Patent Literature

Non Patent Literature 1: George John et al., Polymer Bulletin, 22, p. 89-94 (1989)
Non Patent Literature 2: Muhammad A. Hussain, Journal of Polymer Science: Part A: Polymer Chemistry, 46, p. 747-752 (2008)

SUMMARY OF INVENTION

Technical Problem

Cellulose bioplastic, whose properties are influenced by inherent properties of cellulose, is insufficient in strength, heat resistance, water resistance and thermoplasticity. These properties need to be improved particularly when cellulose bioplastic is applied to durable products such as packaging for electronic devices.

Cellulose bioplastic has another problem. When a plasticizer is added in order to improve thermoplasticity, heat resistance and strength (in particular, rigidity) decrease, and also decrease in uniformity and bleed out of a plasticizer (a plasticizer bleeds out in the surface of a compact) occur. Furthermore, when a plasticizer formed of a petroleum feedstock is added in a large amount, the utilization ratio of plants (vegetism) decreases.

An object of the present invention is to provide a cellulose resin having improved thermoplasticity, mechanical characteristics and water resistance and having a high vegetism and a high utilization ratio of a non-edible part, and to provide a method for producing the cellulose resin.

Solution to Problem

According to an exemplary aspect, there is provided a cellulose resin produced by binding cardanol or a derivative thereof and abietic acid or a derivative thereof to cellulose or a derivative thereof.

According to another exemplary aspect, there is provided a molding material including the cellulose resin as a base resin.

According to another exemplary aspect, there is provided a method for producing a cellulose resin, including:

reacting a multifunctional compound capable of reacting with a hydroxy group of cellulose and a phenolic hydroxy group of cardanol, with cardanol to form a cardanol derivative; and reacting the cardanol derivative and an abietic acid or a derivative thereof with cellulose or a derivative thereof to bind the cardanol derivative and the abietic acid or a derivative thereof to the cellulose or a derivative thereof.

Advantageous Effects of Invention

According to the present invention, it is possible to provide a cellulose resin having improved thermoplasticity, mechanical characteristics and water resistance and having a high vegetism and a high utilization ratio of a non-edible part, and to provide a method for producing the cellulose resin.

DESCRIPTION OF EMBODIMENTS

According to an exemplary embodiment, a cellulose resin is obtained by binding cardanol (or a derivative thereof) and abietic acid (or a derivative thereof) to cellulose (or a derivative thereof) in the form of graft (hereinafter referred to as "grafting").

Owing to such grafting, mechanical characteristics (particularly toughness) and water resistance can be improved. Furthermore, since good thermoplasticity is provided by the grafting, the amount of plasticizer to be added can be reduced or a plasticizer may not be added. As a result, heat resistance and strength (particularly rigidity) can be suppressed from reducing compared to the cellulose resin containing a plasticizer, and homogeneity of the resultant resin can be improved. In addition, a problem of bleed out can be overcome. Furthermore, since the addition amount of plasticizer made of a petroleum feedstock can be lowered or reduced to zero, vegetism can be enhanced. In addition, since cellulose, cardanol and abietic acid are both derived from non-edible parts of plants, the utilization ratio of non-edible parts can be increased.

By grafting with both cardanol (or a derivative thereof) and abietic acid (or a derivative thereof), rigidity and water resistance can be improved, compared to grafting singly with cardanol (or a derivative thereof) alone.

Cellulose is a straight-chain polymer of β-glucose, represented by the following formula (1) and each glucose unit has three hydroxy groups. Using these hydroxy groups, cardanol (or a derivative thereof) and abietic acid (or a derivative thereof) can be grafted.

[Formula 1]

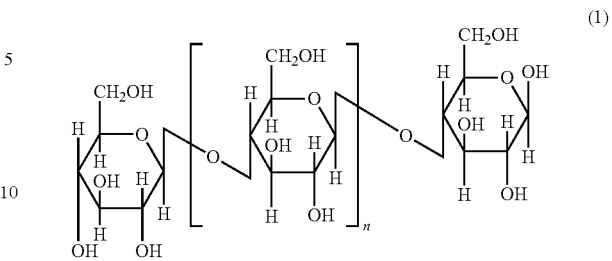

(1)

Cellulose is a main component of plants and can be obtained by a separation treatment for removing other components such as lignin from the plants. Other than the cellulose thus obtained, cellulose obtained by purification of cotton or pulp rich in cellulose content can be used, or the cotton or pulp can be directly used.

The polymerization degree of cellulose (or a derivative thereof) preferably falls within the range of 50 to 5000 and more preferably 100 to 3000 in teams of glucose polymerization degree. If the polymerization degree is extremely low, the strength and heat resistance of the produced resin may not be sufficient in some cases. Conversely, if the polymerization degree is extremely high, the melt viscosity of the produced resin is extremely high, interfering with molding in some cases.

Cellulose (or a derivative thereof) may be mixed with chitin and chitosan having an analogous structure. When cellulose is mixed with them, the amount thereof is preferably 30% by mass or less relative to the total amount of mixture, preferably 20% by mass or less and further preferably 10% by mass or less.

A cellulose derivative herein refers to cellulose having hydroxy groups partly acylated, etherified or grafted. Specific examples thereof include organic acid esters such as cellulose acetate, cellulose butyrate and cellulose propionate; inorganic acid esters such as cellulose nitrate, cellulose sulfate and cellulose phosphate; mixed esters such as cellulose acetate propionate, cellulose acetate butyrate, cellulose acetate phthalate and cellulose acetate nitrate; and etherified cellulose such as methylcellulose, hydroxyethylcellulose and hydroxypropylcellulose. Furthermore, celluloses grafted with styrene, (meth)acrylic acid, (meth)acrylate, ε-caprolactone, lactide, glycolide, etc. These esterified cellulose, etherified cellulose and grafted cellulose may be used singly or in combination of two or more types.

As the cellulose (or a derivative thereof) of the exemplary embodiment, for example, at least one acylated cellulose selected from a cellulose acetate, cellulose propionate and cellulose butyrate, which have hydroxy groups partially acylated, can be preferably used.

The term "cellulose derivative" used herein includes both a cellulose compound and a compound having a cellulose skeleton obtained by biologically or chemically introducing a functional group into raw-material cellulose.

Cardanol is a component contained in the shell of cashew nut, and is an organic compound represented by the following formula (2), which has a phenol moiety and a straight-chain hydrocarbon moiety. There are 4 types of cardanols different in the number of unsaturated bonds in the straight-chain hydrocarbon moiety R. Usually, cardanol is a mixture of these 4 components. To be more specific, cardanol is a mixture of 3-pentadecylphenol, 3-pentadecylphenol monoene, 3-pentadecylphenol diene and 3-pentadecylphenol triene, described in the following formula (2). A cardanol component obtained by extracting and purifying from a cashew nutshell liquid can be used.

[Formula 2]

(2)

R: —(CH$_2$)$_{14}$CH$_3$
—(CH$_2$)$_7$CH=CH(CH$_2$)$_5$CH$_3$
—(CH$_2$)$_7$CH=CHCH$_2$CH=CH(CH$_2$)$_2$CH$_3$
—(CH$_2$)$_7$CH=CHCH$_2$CH=CHCH$_2$CH=CH$_2$

The straight-chain hydrocarbon moiety of cardanol contributes to improving flexibility and hydrophobicity of a resin, whereas the phenol moiety has a highly reactive phenolic hydroxy group for use in grafting. When such cardanol (or a derivative thereof) is grafted to cellulose (or a derivative thereof), a cellulose structure to which cardanol (or a derivative thereof) is added like bristles is formed. As a result, mechanical characteristics (particularly toughness) can be improved, and thermoplasticity can be obtained. In addition, owing to hydrophobicity of cardanol, water resistance can be improved.

Grafting can be performed through a binding reaction by dehydration between the phenolic hydroxy group of cardanol (or a derivative thereof) and a hydroxy group of cellulose (or a derivative thereof). At this time, a dehydration catalyst such as sulfuric acid, toluene sulfonic acid and hydrogen chloride can be added. As a result, a cellulose carbon atom to which a hydroxy group of cellulose (or a derivative thereof) is bound and a cardanol carbon atom to which the phenolic hydroxy group of cardanol (or a derivative thereof) is bound are linked via an oxygen atom.

Also, grafting can be performed by use of a multifunctional compound capable of reacting with a hydroxy group of cellulose and the phenolic hydroxy group of cardanol. As a result, a cellulose carbon atom to which a hydroxy group of cellulose (or a derivative thereof) is bound and a cardanol carbon atom to which the phenolic hydroxy group of cardanol (or a derivative thereof) is bound are linked via an organic linking group. According to such grafting, efficiency of a grafting reaction can be improved and a side reaction can be suppressed.

The organic linking group may have a first bond binding to the cellulose carbon atom, the bond being selected from an ester bond, an ether bond and a urethane bond, and a second bond binding to the cardanol carbon atom, the bond being selected from an ester bond, an ether bond and a urethane bond.

For example, this multifunctional compound and cardanol are bound by use of the phenolic hydroxy group of cardanol and one of the functional groups of the multifunctional compound, and the resultant cardanol derivative and cellulose (or a derivative thereof) can be bound by use of a hydroxy group of cellulose (or a derivative thereof) and the functional group (the functional group derived from the multifunctional compound) of the cardanol derivative.

According to the aforementioned grafting, the hydroxy group of cellulose (or a derivative thereof) and the hydroxy group of cardanol (or a derivative thereof) are eliminated to form a graft bond; at the same time, the hydrophobic structure of cardanol can be introduced into cellulose (or a derivative thereof) to improve water resistance.

To graft cardanol (or a derivative thereof) to cellulose (or a derivative thereof), the phenolic hydroxy group of cardanol and a hydroxy group of cellulose are preferably used as mentioned above in view of efficiency of a grafting reaction, resultant molecular structure and water resistance. Since such grafting is made by use of a highly-reactive phenolic hydroxy group, more efficient grafting can be realized compared to grafting using an unsaturated bond (double bond) of the straight-chain hydrocarbon moiety of cardanol. Furthermore, according to the grafting of the exemplary embodiment, since the phenol moiety of cardanol reacts with cellulose and fixed to it, interaction between mutual straight-chain hydrocarbon moieties of the grafted cardanol molecules enhances, and thus a desired effect of improving mechanical characteristics can be obtained. Furthermore, in the exemplary embodiment, grafting is performed by eliminating the phenolic hydroxy group of cardanol, water resistance can be improved (suppressing water absorbability) compared to grafting that does not use a phenolic hydroxy group. Also from this point of view, the grafting of the exemplary embodiment is advantageous.

The aforementioned multifunctional compounds and organic linking groups preferably include a hydrocarbon group. The number of carbon atoms of the hydrocarbon group is preferably 1 or more and more preferably 2 or more, and also preferably 20 or less, more preferably 14 or less and further preferably 8 or less. If the number of carbon atoms is excessively large, the molecule becomes excessively large and thus reactivity reduces. As a result, it is often difficult to increase a grafting rate. As such a hydrocarbon group, a divalent group is preferable. Examples thereof include a divalent straight-chain aliphatic hydrocarbon groups (straight-chain alkylene group) such as a methylene group, an ethylene group, a propylene group, a butylene group, a pentamethylene group, a hexamethylene group, a heptamethylene group, an octamethylene group, a decamethylene group, a dodecamethylene group and a hexadecamethylene group; divalent alicyclic hydrocarbon groups such as a cycloheptane ring group, a cyclohexane ring group, a cyclooctane ring group, a bicyclopentane ring group, a tricyclohexane ring group, a bicyclooctane ring group, a bicyclononane ring group and a tricyclodecane ring group; divalent aromatic hydrocarbon groups such as a benzene ring group, a naphthalene ring group and a biphenylene group; and divalent groups composed of combinations of these.

When the hydrocarbon group as mentioned above is an aromatic hydrocarbon group or an alicyclic hydrocarbon group, because of its stiffness, the rigidity of the resultant resin can be improved. In contrast, when the hydrocarbon group is a straight-chain aliphatic hydrocarbon group, because of its flexibility, the toughness of the resultant resin can be improved.

As a functional group of a multifunctional compound as mentioned above, a group selected from a carboxyl group, a carboxylic acid anhydride group, a carboxylic halide group (particularly, carboxylic chloride group), an acryl group, an epoxy group, an isocyanate group and a halogen group is preferred. Of them, a carboxyl group, a carboxylic acid anhydride group, a halogen group (particularly, a chloride group) and an isocyanate group are preferred. As the functional group to be reacted with the phenolic hydroxy group of cardanol, particularly, a carboxylic acid anhydride group, a halogen group (particularly, chloride group) and an isocyanate group are preferred. As the functional group to be reacted with a hydroxy group of cellulose, particularly, a carboxylic halide group (particularly, a carboxylic chloride group), an acid anhydride group, an acryl group and an isocyanate group are preferred. The carboxylic halide group can be formed by converting a carboxyl group before grafting into an acid halide group. The acid anhydride group may be an oligomer composed of acid anhydrides.

Specific examples of such a multifunctional compound include dicarboxylic acid, carboxylic acid anhydride, dicarboxylic acid halide, monochlorocarboxylic acid, acrylic acid and a derivative thereof, and diisocyanates. Examples of the dicarboxylic acid include malonic acid, succinic acid, glutaric acid, pimelic acid, suberic acid, azelaic acid, sebacic acid, dodecane dicarboxylic acid, pentadecane dicarboxylic acid and hexadecane dicarboxylic acid. Examples of the carboxylic acid anhydride include anhydrides of these dicarboxylic acids and maleic anhydride. The maleic anhydride may be an oligomer composed of maleic anhydrides. Examples of the dicarboxylic acid halide include acid halides of these dicarboxylic acids. Examples of the monochlorocarboxylic acid include monochloroacetic acid, 3-chloropropionic acid, 3-fluoropropionic acid, 4-chlorobutyric acid, 4-fluorobutyric acid, 5-chlorovaleric acid, 5-fluorovaleric acid, 6-chlorohexanoic acid, 6-fluorohexanoic acid, 8-chlorooctanoic acid, 8-fluorooctanoic acid, 12-chlorododecanoic acid, 12-fluorododecanoic acid, 18-chlorostearic acid and 18-fluorostearic acid. Examples of the acrylic acid and a derivative thereof include acrylic acid, acrylyl chloride, methacrylic acid and methacrylyl chloride. Examples of the diisocyanates include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethylxylene diisocyanate (TMXDI), 1,6,11-undecane triisocyanate, 1,8-diisocyanatemethyloctane, lysine ester triisocyanate, 1,3,6-hexamethylene triisocyanate, bicycloheptane triisocyanate and dicyclohexylmethane diisocyanate (HMDI: hydrogenated MDI). Of these, tolylene diisocyanate (TDI), 4,4'-diphenylmethane diisocyanate (MDI) and 1,6-hexamethylene diisocyanate (HDI) can be preferably used.

One of the functional groups of a multifunctional compound as mentioned above and the phenolic hydroxy group of cardanol are reacted to foam a cardanol derivative, and then, the cardanol derivative is bound to cellulose (or a derivative thereof) by use of a hydroxy group of cellulose (or a derivative thereof) and the functional group (derived from the multifunctional compound) of the cardanol derivative.

For example, a carboxylic acid-based multifunctional compound (dicarboxylic acid, carboxylic acid anhydride or monochloro carboxylic acid) is reacted with cardanol, the phenolic hydroxy group of the cardanol and a functional group of the multifunctional compound (carboxyl group, carboxylic acid anhydride group or halogen group (particularly, chloride group)) are reacted to form a cardanol derivative, and the remaining functional group (carboxyl group) is converted into a carboxylic halide group (particularly, carboxylic chloride group). The cardanol derivative is reacted with cellulose (or a derivative thereof) to react a hydroxy group of the cellulose (or a derivative thereof) with the carboxylic halide group of the cardanol derivative. In this way, grafting can be performed. In this case, grafting can be extremely efficiently performed.

As a result of grafting using a multifunctional compound, the cellulose carbon atom to which a hydroxy group of cellulose (or a derivative thereof) is bound and the hydrocarbon group of a multifunctional compound are allowed to bind, for example, via an ester bond, an ether bond or a urethane bond, preferably via an ester bond; whereas the cardanol carbon atom to which the phenolic hydroxy group of cardanol (or a derivative thereof) is bound and the organic linking group of the multifunctional compound are allowed to bind, for example, via an ester bond, an ether bond or a urethane bond, preferably via an ester bond or an ether bond.

An unsaturated bond(s) (double bond) of the straight-chain hydrocarbon moiety of the cardanol are preferably hydrogenated and converted into a saturation bond. The conversion rate (hydrogenation rate) of the unsaturated bonds by hydrogenation is preferably 90% by mole or more and more preferably 95% by mole or more. After hydrogenation, the residual ratio (the number of unsaturated bonds per cardanol molecule) of unsaturated bonds of the cardanol is preferably 0.2 (bonds/molecule) or less and more preferably 0.1 (bond/molecule) or less. Furthermore, the aromatic ring of the phenol moiety of cardanol may be hydrogenated and converted into a cyclohexane ring.

When cardanol (or a derivative thereof), in which a large number of unsaturated bonds still remain in the straight-chain hydrocarbon moiety, is grafted to cellulose (or a derivative thereof), a side reaction likely to occur, with the result that grafting cannot be efficiently performed and the solubility of a grafted product in a solvent may often significantly reduce. When a cardanol derivative in which an unsaturated bond(s) of the straight-chain hydrocarbon moiety are sufficiently converted into saturated bonds by hydrogenation, is grafted, grafting can be efficiently performed while suppressing a side reaction and in addition, solubility reduction of a grafted product in a solvent can be suppressed.

The hydrogenation method is not particularly limited and a method known in the art can be used. Examples of the catalyst include a precious metal such as palladium, ruthenium and rhodium, nickel, and a substance made by immobilizing a metal selected from these on a carrier such as activated carbon, activated alumina and diatom earth. As the reaction system, a batch system in which a reaction is performed while suspending and stirring a powdery catalyst and a continuous system using a reaction tower charged with a molded catalyst can be employed. The solvent for hydrogenation may not be used depending upon the system of hydrogenation. However, when a solvent is used, examples of the solvent include alcohols, ethers, esters and saturated hydrocarbons generally. The reaction temperature for hydrogenation is not particularly limited; however, it can be usually set to 20 to 250° C. and preferably 50 to 200° C. If the reaction temperature is excessively low, a hydrogenation rate becomes low. Conversely, if the reaction temperature is excessively high, the amount of decomposition product may increase. The hydrogen pressure during the hydrogenation can be usually set to 10 to 80 kgf/cm$^2$ (9.8×10$^5$ to 78.4×10$^5$ Pa) and preferably 20 to 50 kgf/cm$^2$ (19.6×10$^5$ to 49.0×10$^5$ Pa).

Hydrogenation can be performed before the cardanol derivative is formed, after the cardanol derivative is formed and before the cardanol derivative is grafted, or after the cardanol derivative is grafted; however, in view of the reaction efficiency of hydrogenation and grafting reaction, hydrogenation is preferably performed before the cardanol derivative is grafted and further preferably before the cardanol derivative is formed.

The ratio (grafting rate) of cardanol (or a derivative thereof) bound to cellulose (or a derivative thereof) relative to the cellulose (or a derivative thereof) is represented by the number (average value) of cardanol molecules (or a derivative thereof) to be added per glucose unit of cellulose (or a derivative thereof), in other words, the number (average value) of hydroxy groups bound to cardanol molecules (or a derivative thereof) per glucose unit of cellulose (or a derivative thereof) (the degree of substitution of the hydroxy group, $DS_{CD}$). $DS_{CD}$ is preferably 0.05 or more, more preferably 0.1 or more and further preferably 0.2 or more. When $DS_{CD}$ is excessively low, the effect by grafting may not be sufficiently obtained.

In the exemplary embodiment, in addition of the grafting with the aforementioned cardanol (or a derivative thereof), abietic acid (or a derivative thereof) is grafted.

Abietic acid, which is contained in rosin as a main component, has a rigid and hydrophobic hydrocarbon moiety and a reactive functional group (carboxyl group) as represented by the following formula (3). In particular, abietic acid derived from pine resins can be stably supplied.

[Formula 3]

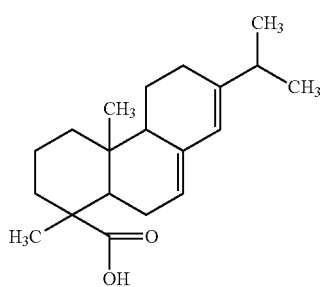

(3)

When abietic acid (or a derivative thereof) is grafted to cellulose (or a derivative thereof) together with cardanol (or a derivative thereof), rigidity and water resistance can be improved compared the case where cardanol (or a derivative thereof) alone is singly grafted.

Abietic acid (or a derivative thereof) can be grafted by use of the carboxyl group of abietic acid (or a derivative thereof). As a result, the abietic acid carbon atom to which the carboxyl group of abietic acid (or a derivative thereof) is bound, and a cellulose carbon atom to which a hydroxy group of cellulose (or a derivative thereof) is bound, are linked at least via a bond derived from the carboxyl group.

Such grafting of abietic acid (or a derivative thereof) can be performed through a dehydration condensation reaction between the carboxyl group of abietic acid (or a derivative thereof) and a hydroxy group of cellulose (or a derivative thereof). Alternatively, the grafting can be performed by converting the carboxylic acid group of abietic acid (or a derivative thereof) into an acid halide group (particularly, an acid chloride group) and reacting the acid halide group with a cellulose hydroxy group. In this case, grafting can be more efficiently performed. As a result, the abietic acid carbon atom to which the carboxyl group of abietic acid (or a derivative thereof) is bound, and the cellulose carbon atom to which a hydroxy group of cellulose (or a derivative thereof) is bound, are linked via an ester bond.

Furthermore, abietic acid (or a derivative thereof) is grafted by using a hydroxy group of cellulose and a multifunctional compound capable of reacting with the carboxyl group of abietic acid or a functional group converted from the carboxy group. As a result, the cellulose carbon atom to which a hydroxy group of cellulose (or a derivative thereof) is bound, and the abietic acid carbon atom to which the carboxyl group of abietic acid (or a derivative thereof) is bound, are linked via an organic linking group. Such a grafting has high graft reaction efficiency and can suppress occurrence of a side reaction.

For example, the multifunctional compound and abietic acid are bound by use of the carboxyl group of abietic acid (or an acid halide group) and a functional group of the multifunctional compound. The resultant abietic acid derivative and cellulose (or a derivative thereof) can be bound by use of a hydroxy group of cellulose (or a derivative thereof) and the functional group (the functional group derived from the multifunctional compound) of the abietic acid derivative.

According to the aforementioned grafting, a hydroxy group of cellulose (or a derivative thereof) and the carboxyl group of abietic acid (or a derivative thereof) are eliminated to form a graft bond; at the same time, the hydrophobic condensation polycyclic structure of abietic acid can be introduced into the cellulose (or a derivative thereof).

The multifunctional compound for use in grafting abietic acid (or a derivative thereof), and the organic linking group preferably include a hydrocarbon group. The number of carbon atoms of the hydrocarbon group is preferably one or more and more preferably 2 or more, and also preferably 20 or less and more preferably 14 or less. If the number of carbon atoms is excessively large, the size of the molecule becomes extremely large and thus reactivity decreases. As a result, it is often difficult to increase a grafting rate.

As such a hydrocarbon group, a straight hydrocarbon group having flexibility is more preferable. When abietic acid (or a derivative thereof) having a rigid and condensed polycyclic structure is grafted, an appropriate flexibility can be imparted by the organic linking group. As a result, the effect of improving strength can be improved by grafting.

As such a hydrocarbon group, a divalent group is preferably used. Examples thereof include straight aliphatic hydrocarbon groups (alkylene groups) such as a methylene group, an ethylene group, a propylene group, a butylene group, a pentamethylene group, a hexamethylene group, a heptamethylene group, an octamethylene group, a decamethylene group, a dodecamethylene group and a hexadecamethylene group; divalent alicyclic hydrocarbon groups such as a cycloheptane ring group, a cyclohexane ring group, a cyclooctane ring group, a bicyclopentane ring group, a tricyclohexane ring group, a bicyclooctane ring group, a bicyclononane ring group and a tricyclodecane ring group; divalent aromatic ring hydrocarbon groups such as a benzene ring group, a naphthalene ring group and a biphenylene group; and divalent groups composed of combination of these groups.

In the multifunctional compound for grafting abietic acid (or a derivative thereof), examples of the functional group capable of reacting with the carboxyl group of abietic acid include a hydroxy group, an amino group, an epoxy group, an isocyanate group, an oxazoline group, an oxazine group and an aziridine group, and a hydroxy group and amino group are preferably used. Examples of the functional group capable of reacting with the acid halide group converted from the carboxyl group of abietic acid include a hydroxy group and an amino group.

In the multifunctional compound for grafting abietic acid (or a derivative thereof), the functional group capable of reacting with a hydroxy group of cellulose include a carboxyl group, a carboxylic acid halide group, an epoxy group, an isocyanate group and a halogen group. Of them, a carboxyl group, a carboxylic acid halide group (particularly, carboxylic acid chloride group) and a halogen group (particularly, chloride group) are preferable, a carboxyl group and a carboxylic acid halide group (particularly, carboxylic acid chloride group) are more preferable, and a carboxylic acid halide group (particularly, carboxylic acid chloride group) is particularly preferable.

Specific examples of the multifunctional compound having such a functional group include hydroxycarboxylic acids such as 3-hydroxypropionic acid, 4-hydroxybutyric acid, 5-hydroxyvaleric acid, 6-hydroxycaproic acid, 7-hydroxyenanthic acid, 8-hydroxycaprylic acid, 12-hydroxylaurylic acid, 15-hydroxypentadecanoic acid, 16-hydroxyparmitic acid, 12-hydroxystearic acid, 18-hydroxystearic acid and halides of these acids (particularly, acid chlorides); and aminocarboxylic acids such as 3-aminopropionic acid, 4-aminobutyric acid, 5-aminovaleric acid, 6-aminocaproic acid, 7-aminoenanthic acid, 8-aminocaprylic acid, 12-aminolaurylic acid, 15-aminopentadecanoic acid, 16-aminoparmitic acid, 12-aminostearic acid, 18-aminostearic acid and halides of these acids (particularly, acid chloride).

A functional group of the multifunctional compound is reacted with the carboxyl group of abietic acid to form an abietic acid derivative. The abietic acid derivative can be bound to cellulose (or a derivative thereof) by use of a hydroxy group of cellulose (or a derivative thereof) and the functional group (functional group derived from the multifunctional compound) of the abietic acid derivative.

For example, a multifunctional compound having a carboxyl group and a hydroxy group is reacted with abietic acid. The carboxyl group of abietic acid (or an acid halide group thereof) and the hydroxy group of the multifunctional compound to form an abietic acid derivative, and the remaining functional group (carboxyl group) is converted into a carboxylic halide group (particularly, carboxylic chloride group). The abietic acid derivative is reacted with cellulose (or a derivative thereof). A hydroxy group of the cellulose (or a derivative thereof) is reacted with the carboxylic halide group of the abietic acid derivative. In this manner, grafting can be performed. In this case, grafting can be more efficiently performed.

As a result of grafting using a multifunctional compound, the cellulose carbon atom to which a hydroxy group of cellulose (or a derivative thereof) is bound, and the hydrocarbon group of a multifunctional compound are allowed to bind, for example, via an ester bond, an ether bond or a urethane bond; whereas the abietic acid carbon atom to which the carboxyl group of abietic acid (or a derivative thereof) is bound, and the hydrocarbon group of the multifunctional compound are allowed to bind, for example, via an ester bond, an amide bond, an amide ester bond or an amino ester bond.

In abietic acid, an unsaturated bond is preferably hydrogenated and converted into a saturation bond. The conversion rate of the unsaturated bonds by hydrogenation is preferably 90% by mole or more, and more preferably 95% by mole or more. When abietic acid (or a derivative thereof) in which unsaturated bonds still remain is grafted to cellulose (or a derivative thereof), a side reaction likely occurs, with the result that grafting may not be efficiently performed. The hydrogenation of abietic acid can be performed in the same manner as in the aforementioned hydrogenation of cardanol.

Hydrogenation of abietic acid can be performed before an abietic acid derivative is formed, after an abietic acid derivative is formed and before the abietic acid derivative is grafted, or after an abietic acid derivative is grafted; however, in view of the reaction efficiency of hydrogenation and grafting reaction, hydrogenation is preferably performed before an abietic acid derivative is grafted and further preferably before an abietic acid derivative is formed.

The ratio (grafting rate) of abietic acid (or a derivative thereof) bound to cellulose (or a derivative thereof) relative to the cellulose (or a derivative thereof) is represented by the number (average value) of abietic acid molecules (or a derivative thereof) per glucose unit of cellulose (or a derivative thereof), in other words, the number (average value) of hydroxy groups bound to abietic acid molecule (or a derivative thereof) per glucose unit of cellulose (or a derivative thereof) (the degree of substitution of the hydroxy group, $DS_{Ab}$). $DS_{Ab}$ is preferably 0.05 or more, more preferably 0.1 or more and further preferably 0.2 or more. When $DS_{Ab}$ is excessively low, the effect by grafting may not be sufficiently obtained.

Furthermore, the total number of cardanol molecules or derivatives thereof and abietic acid molecules or derivatives thereof added per glucose unit (total substitution degree: $DS_{Total}=DS_{Ab}+DS_{CD}$) is preferably 0.1 or more, more preferably 0.2 or more, further preferably 0.3 or more and particularly preferably 0.4 or more.

The maximum value of the total substitution degree ($DS_{Total}$) is theoretically "3"; however, in view of facilitating production (grafting), $DS_{Total}$ is preferably 2.5 or less, more preferably 2 or less and further preferably 1.5 or less. Furthermore, the total substitution degree ($DS_{Total}$) may be 1 or less; even in this case, sufficient improvement effect can be obtained.

Furthermore, in view of sufficiently obtaining the effect of grafting both abietic acid (or a derivative thereof) and cardanol (or a derivative thereof), the ratio $DS_{Ab}/DS_{CD}$ is preferably 5/95 or more, more preferably 10/90 or more, further preferably 15/85 or more, and particularly preferably 20/80 or more and also preferably 95/5 or less, more preferably 90/10 or less, further preferably 80/20 or less and particularly preferably 70/30 or less.

Grafting of abietic acid (or a derivative thereof) and grafting of cardanol (or a derivative thereof) may be performed simultaneously in the copresence of abietic acid (or a derivative thereof) and cardanol (or a derivative thereof). Alternatively, either one of them may be grafted earlier. In view of efficiency of a grafting reaction, it is preferred that abietic acid (or a derivative thereof) is grafted and then cardanol (or a derivative thereof) is grafted.

Cardanol (or a derivative thereof) and abietic acid (or a derivative thereof) are grafted, and further a specific reactive hydrocarbon compound may be grafted to cellulose (or a derivative thereof). Owing to this, a cellulose resin can be improved so as to have desired properties.

This reactive hydrocarbon compound is a compound having at least one functional group capable of reacting with a hydroxy group of cellulose (or a derivative thereof). Examples thereof include hydrocarbon compounds having a carboxyl group, a carboxylic halide group, a carboxylic acid anhydride group, an isocyanate group and an acryl group. Specific examples thereof include at least one compound selected from monocarboxylic acids such as an aliphatic monocarboxylic acid, an aromatic monocarboxylic acid and an alicyclic monocarboxylic acid, and acid halides or acid anhydrides thereof; at least one compound selected from an aliphatic monoisocyanate, an aromatic monoisocyanate and an alicyclic monoisocyanate; an acrylic acid ester; and a methacrylic acid ester. Examples of the aliphatic monocarboxylic acid include straight and branched (having a side chain) fatty acids. Examples of the aromatic monocarboxylic acid include an aromatic monocarboxylic acid having a carboxyl group directly bound to an aromatic ring, and an aromatic monocarboxylic acid having a carboxyl group bound to the aromatic ring via an alkylene group (for example, methylene group, ethylene group) (the acid having an aliphatic carboxylic acid group bound to the aromatic ring). Examples of the alicyclic monocarboxylic acid include an alicyclic monocarboxylic acid having a carboxyl group directly bound to an alicycle, and an alicyclic monocarboxylic acid having a carboxyl group bound to an alicycle via an alkylene group (for example, methylene group, ethylene group)(the acid having an aliphatic carboxylic acid group bound to an alicycle). Examples of the aliphatic monoisocyanate include an aliphatic monoisocyanate obtained by reacting an aliphatic diisocyanate and a straight or branched (having a side chain) aliphatic monoalcohol in a molar ratio of 1:1. Examples of the aromatic monoisocyanate include an aromatic monoisocyanate obtained by reacting an aromatic diisocyanate and a straight or branched (having a side chain) aliphatic monoalcohol in a molar ratio of 1:1. Examples of the acrylic acid ester and methacrylic acid ester include esters of an acrylic acid or methacrylic acid with a straight or branched (having a side chain) aliphatic monoalcohol.

The reactive hydrocarbon compound preferably has carbon atoms within the range of 1 to 32 and more preferably within the range of 1 to 20. If the number of carbon atoms is excessively large, the size of the molecule becomes excessively large and reaction efficiency decreases due to steric hindrance. As a result, it becomes difficult to increase a grafting rate.

The reactive hydrocarbon compound is effective in improving properties in the case where it is particularly arranged so as to bury gaps in a sterical structure composed of a grafted cardanol (or a derivative thereof) and abietic acid (or a derivative thereof).

When the hydrocarbon group of the reactive hydrocarbon compound is an aromatic hydrocarbon group and an alicyclic hydrocarbon group, it efficiently works to particularly improve rigidity and heat resistance. When the hydrocarbon group is an aliphatic hydrocarbon group, it efficiently works to particularly improve toughness.

Examples of the aliphatic monocarboxylic acid to be used as the reactive hydrocarbon compound include saturated fatty acids such as acetic acid, propionic acid, butyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; unsaturated fatty acids such as butenoic acid, pentenoic acid, hexenoic acid, octenoic acid, undecylenic acid, oleic acid, sorbic acid, linoleic acid, linolenic acid and arachidonic acid; and derivatives of these. These may further have a substituent.

Examples of the aromatic monocarboxylic acid used as the reactive hydrocarbon compound include an aromatic carboxylic acid having a carboxyl group introduced in a benzene ring such as benzoic acid; an aromatic carboxylic acid having an alkyl group introduced in a benzene ring such as toluic acid; an aromatic carboxylic acid having an aliphatic carboxylic acid group introduced in a benzene ring such as phenylacetic acid and phenyl propionic acid; an aromatic carboxylic acid having two or more benzene rings such as biphenylcarboxylic acid and biphenylacetic acid; an aromatic carboxylic acid having a condensed-ring structure such as naphthalene carboxylic acid and tetralin carboxylic acid; and derivatives of these.

Examples of the alicyclic monocarboxylic acid to be used as the reactive hydrocarbon compound include an alicyclic monocarboxylic acid having a carboxyl group introduced to an alicycle such as cyclopentane carboxylic acid, cyclohexane carboxylic acid and cyclooctane carboxylic acid; alicyclic monocarboxylic acids having an aliphatic carboxylic acid introduced in an alicycle such as cyclohexyl acetic acid; and derivatives of these.

If an organic silicon compound and an organic fluorine compound are added to these reactive hydrocarbon compound structures, properties such as water resistance can be more effectively improved.

As the reactive functional groups of these reactive hydrocarbon compounds, any reactive functional groups are used as long as they can react with a hydroxy group of cellulose. Examples thereof include a carboxyl group, a carboxylic acid halide group (particularly, a carboxylic acid chloride group), and a carboxylic acid anhydride, and further include an epoxy group, an isocyanate group and a halogen group (particularly, a chloride group). Of these, a carboxyl group and a carboxylic halide group are preferable and a carboxylic acid chloride group is particularly preferable. Examples of the carboxylic acid halide group (particularly, a carboxylic acid chloride group) include an acid halide group (particularly, an acid chloride group) in which a carboxyl group of each of the carboxylic acids mentioned above is acid-halogenated.

As the reactive hydrocarbon compound used in the exemplary embodiment, particularly in view of rigidity (bending strength, etc.) of a resin, at least one monocarboxylic acid selected from aromatic carboxylic acids and alicyclic carboxylic acids, or an acid halide or acid anhydride thereof are preferable. By adding such a reactive hydrocarbon compound to a cellulose hydroxy group, a structure formed by adding an acyl group derived from at least one monocarboxylic acid selected from aromatic carboxylic acids and alicyclic carboxylic acids to a cellulose hydroxy group (i.e., a structure obtained by substituting a hydrogen atom of cellulose hydroxyl group with an acyl group) can be obtained.

The number (average value) of reactive hydrocarbon compounds (the number of acyl groups) to be added per glucose unit of cellulose (or a derivative thereof), in other words, the number (average value) of hydroxy groups bound to a reactive hydrocarbon compound per glucose unit (the degree of substitution of the hydroxy group, $DS_{XX}$) is, in view of obtaining a desired effect, preferably 0.1 or more and 0.6 or less and more preferably 0.1 or more and 0.5 or less. Furthermore, after cardanol (or a derivative thereof) and a reactive hydrocarbon compound are grafted, the number (average value) of remaining hydroxy groups per glucose unit (hydroxy group remaining degree, $DS_{OH}$) is, in view of sufficiently ensuring water resistance, preferably 0.9 or less and more preferably, 0.7 or less.

The reactive hydrocarbon compound can be grafted in the grafting step of cardanol (or a derivative thereof) and abietic acid (or a derivative thereof). Owing to this, grafting can be made uniformly. At this time, these may be added simultaneously or separately. However, if cardanol (or a derivative thereof) and abietic acid (or a derivative thereof) are grafted and thereafter a reactive hydrocarbon compound is added and grafted, the efficiency of a grafting reaction can be improved.

A grafting treatment can be performed by heating cellulose (or a derivative thereof), cardanol (or a derivative thereof) and abietic acid (or a derivative thereof), if necessary, a reactive hydrocarbon compound in a solvent dissolving them at an appropriate temperature. Cellulose is rarely dissolved in a general solvent; however dissolved in e.g., a dimethylsulfoxide-amine solvent, a dimethylformamide-chloral-pyridine solvent, a dimethylacetamide-lithium chloride solvent and an imidazolium ionic liquid. When a grafting reaction is performed in a general solvent, a cellulose derivative, the solubility of which has been changed by previously binding a carboxylic acid or an alcohol to a part of hydroxy groups of cellulose to reduce intermolecular force, can be used. Acylated cellulose, in which the hydrogen atom of a hydroxy group is substituted with an acyl group such as an acetyl group, a propionyl group and a butyryl group, is preferable. In particular, cellulose acetate, which is a cellulose acetylated by acetic acid or acetyl chloride, is preferable. Acetic acid, propionic acid, butyric acid and an acid halide and acid anhydride thereof are included in the aforementioned reactive hydrocarbon compounds; however, like this example, whole or part of predetermined reactive hydrocarbon compounds can be added (grafted) to a hydroxy group of cellulose before grafting with cardanol (or a derivative thereof).

The remaining cellulose hydroxy group that is not used in grafting cardanol (or a derivative thereof) and abietic acid (or a derivative thereof) is a hydroxy group without being modified, a hydroxy group to be modified by acetylation, or a hydroxy group to which a reactive hydrocarbon compound is added (grafted). As the amount of hydroxy group increases, maximum strength and heat resistance tend to increase; whereas water absorbability tends to increase. As the conversion rate (degree of substitution) of hydroxy groups increases, water absorbability tends to decrease, plasticity and breaking strain tend to increase; whereas, maximum strength and heat resistance tend to decrease. In consideration of these tendencies and grafting conditions, the conversion rate of hydroxy groups can be appropriately set.

In view of ensuring sufficient water resistance, the number (average value) of remaining hydroxy groups of a cellulose resin grafted per glucose unit (hydroxy group remaining degree, $DS_{OH}$) is preferably 0.9 or less and more preferably 0.7 or less.

In view of water absorbability, mechanical strength and heat resistance, it is preferred that the cellulose hydroxy groups are partly acylated with a reactive hydrocarbon as mentioned above. Furthermore, in view of the aforementioned grafting treatment of cardanol (or a derivative thereof) and abietic acid (or a derivative thereof), it is preferred that cellulose hydroxy groups are appropriately acylated (particularly, acetylated) before grafting of them. The number of acyl groups (average value) to be added per glucose unit of cellulose (or a derivative thereof), in other words, the number of hydroxy groups acylated (degree of substitution of the hydroxy group, $DS_{AC}$) (average value) is preferably 0.5 or more in view of obtaining sufficient acylation effect, more preferably 1.0 or more, and further preferably 1.5 or more. Furthermore, in view of ensuring the sufficient grafting rate ($DS_{CD}$, $DS_{Ab}$), the degree of substitution of the hydroxy group, $DS_{AC}$ by acylation is preferably 2.7 or less, more preferably 2.5 or less and further preferably 2.2 or less. At this time, the total substitution degree ($DS_{Ab}+DS_{CD}$) can be set so as to fall, for example, within the range of 0.1 to 2.0. The acyl group to be added by acylation is preferably at least one acyl group selected from an acetyl group, a propionyl group and a butyryl group. Note that the degree of acetylation is represented by $DS_{Ace}$, the degree of propionation is represented by $DS_{Pr}$, and the degree of butylation is represented by $DS_{Bu}$.

In the cellulose resin of the exemplary embodiment, in view of ensuring a sufficient plant utilization ratio, the mass ratio (plant component ratio) of the sum of a cellulose component, a cardanol component and an abietic acid component relative to the total cellulose resin grafted is preferably 50% or more, and more preferably 60% or more. The cellulose component herein corresponds to the structure represented by Formula (1) where hydroxy groups are not acylated or grafted, whereas the cardanol component corresponds to the structure represented by Formula (2) and the abietic acid component corresponds to the structure represented by Formula (3). On the assumption of these, calculation is made to obtain the mass ratio.

To the cellulose resin of the exemplary embodiment described above, various types of additives usually used in thermoplastic resins can be applied. For example, if a plasticizer is added, thermoplasticity and breaking elongation can be more improved. Examples of such a plasticizer include phthalic esters such as dibutyl phthalate, diaryl phthalate, diethyl phthalate, dimethyl phthalate, di-2-methoxyethyl phthalate, ethyl phthalyl ethyl glycolate and methyl phthalyl ethyl glycolate; tartaric acid esters such as dibutyl tartrate; adipic acid esters such as dioctyl adipate and diisononyl adipate; polyhydric alcohol esters such as triacetin, diacetyl glycerin, tripropionitrile glycerin and glyceryl monostearate; phosphoric acid esters such as triethyl phosphate, triphenyl phosphate and tricresyl phosphate; dibasic fatty acid esters such as dibutyl adipate, dioctyl adipate, dibutyl azelate, dioctyl azelate and dioctyl sebacate; citric acid esters such as triethyl citrate, acetyltriethyl citrate and tributyl acetylcitrate; epoxylated vegetable oils such as epoxylated soybean oil and epoxylated linseed oil; castor oil and a derivative thereof; benzoic acid esters such as ethyl O-benzoyl benzoate; aliphatic dicarboxylic acid esters such as sebacate and azelate; unsaturated dicarboxylic acid esters such as maleate; and N-ethyl toluene sulfonamide, triacetin, O-cresyl p-toluenesulfonate and tripropionin.

Examples of other plasticizers include cyclohexane dicarboxylic acid esters such as dihexyl cyclohexanedicarboxylate, dioctyl cyclohexanedicarboxylate and di-2-methyloctyl cyclohexanedicarboxylate; trimellitic acid esters such as dihexyl trimellitate, diethylhexyl trimellitate and dioctyl trimellitate; and pyromellitic acid esters such as dihexyl pyromellitate, diethylhexyl pyromellitate and dioctyl pyromellitate.

The reactive functional group (a carboxylic acid group, a group derived from a carboxylic acid group, other functional groups) of such a plasticizer may be reacted with a hydroxy group or an unsaturated bond of cardanol to allow cardanol to add to a plasticizer. If such a plasticizer is used, compatibility of the cellulose resin of the exemplary embodiment and the plasticizer can be improved. Therefore, the addition effect of the plasticizer can be more improved.

To the cellulose resin of the exemplary embodiment, if necessary, an inorganic or organic granular or fibrous filler can be added. By adding a filler, strength and rigidity can be more improved. Examples of the filler include, mineral particles (talc, mica, baked siliceous earth, kaolin, sericite, bentonite, smectite, clay, silica, quartz powder, glass beads, glass powder, glass flake, milled fiber, Wollastonite, etc.), boron-containing compounds (boron nitride, boron carbonate, titanium boride etc.), metal carbonates (magnesium carbonate, heavy calcium carbonate, light calcium carbonate, etc.), metal silicates (calcium silicate, aluminum silicate, magnesium silicate, magnesium aluminosilicate, etc.), metal oxides (magnesium oxide etc.), metal hydroxides (aluminum hydroxide, calcium hydroxide, magnesium hydroxide, etc.), metal sulfates (calcium sulfate, barium sulfate, etc.), metal carbides (silicon carbide, aluminum carbide, titanium carbide, etc.), metal nitrides (aluminum nitride, silicon nitride, titanium nitride, etc.), white carbon and metal foils. Examples of the fibrous filler include organic fibers (natural fiber, papers etc.), inorganic fibers (glass fiber, asbestos fiber, carbon fiber, silica fiber, silica alumina fiber, Wollastonite, zirconia fiber, potassium titanate fiber etc.) and metal fibers. These fillers can be used singly or in combination of two or more types.

To the cellulose resin of the exemplary embodiment, if necessary, a flame retardant can be added. By adding a flame retardant, flame resistance can be imparted. Examples of the flame retardant include metal hydrates such as magnesium hydroxide, aluminum hydroxide and hydrotalcite, basic magnesium carbonate, calcium carbonate, silica, alumina, talc, clay, zeolite, bromine-based flame retardant, antimony trioxide, phosphoric acid based flame retardant (aromatic phosphate, aromatic condensed phosphate, etc.), compounds containing phosphorus and nitrogen (phosphazene compound), etc. These flame retardants can be used singly or in combination with two or more types.

Furthermore, as the flame retardant, a reaction product between a phosphorus oxide, a phosphoric acid or a derivative of each of these and cardanol, and a polymers of the reactant can be used. If such a flame retardant is used, the interaction between the cellulose resin of the exemplary embodiment and a flame retardant is enhanced, excellent flame-retardant effect can be obtained. Examples of such a flame retardant include a reaction product between phosphorus oxide ($P_2O_5$) or phosphoric acid ($H_3PO_4$) and a hydroxy group of cardanol, and a polymer obtained by adding hexamethylene tetramine to the reactant followed by polymerizing.

To the cellulose resin of the exemplary embodiment, if necessary, a shock resistance improver can be added.

By adding a shock resistance improver, shock resistance can be improved. Examples of the shock resistance improver include a rubber component and a silicone compound. Examples of the rubber component include a natural rubber, epoxylated natural rubber and synthesized rubber. Furthermore, examples of the silicone compound include organic polysiloxane formed by polymerization of alkyl siloxane, alkyl phenyl siloxane, etc., and modified silicone compounds obtained by modifying a side chain or an end of an organic polysiloxane as mentioned above with polyether, methylstyryl, alkyl, higher fatty acid ester, alkoxy, fluorine, an amino group, an epoxy group, a carboxyl group, a carbinol group, a methacryl group, a mercapto group, a phenol group etc. These shock resistance improvers can be used singly or in combination of two or more types.

As the silicone compound, a modified silicone compound (modified polysiloxane compound) is preferred. As the modified silicone compound, a modified polydimethyl siloxane is preferred, which has a structure having a main chain constituted of dimethyl siloxane repeat units and a side chain or a terminal methyl group partly substituted with an organic substituent containing at least one group selected from an amino group, an epoxy group, a carbinol group, a phenol group, a mercapto group, a carboxyl group, a methacryl group, a long-chain alkyl group, an aralkyl group, a phenyl group, a phenoxy group, an alkyl phenoxy group, a long-chain fatty acid ester group, a long-chain fatty acid amide group and a polyether group. The modified silicone compound, because of the presence of such an organic substituent, is improved in affinity for the aforementioned cardanol-added cellulose resin and dispersibility in the cellulose resin is improved. Consequently, a resin composition excellent in shock resistance can be obtained. As such a modified silicone compound, a modified silicone compound produced in accordance with a conventional method or a commercially available product can be used.

In a modified silicone compound, dimethyl siloxane repeat units and organic substituent-containing siloxane repeat units each of which may be homologously and continuously connected, alternately connected or connected at random. A modified silicone compound may have a branched structure.

The number average molecular weight of a modified silicone compound is preferably 900 or more and more preferably 1000 or more, and also preferably 1000000 or less, more preferably 300000 or less and further preferably 100000 or less. If the molecular weight of a modified silicone compound is sufficiently large, loss by vaporization can be suppressed in kneading with a melted cellulose resin during a process for producing a cardanol-added cellulose resin compound. Furthermore, if the molecular weight of a modified silicone compound is appropriate (not excessively large), a uniform molding having good dispersibility can be obtained. As the number average molecular weight, a value (calibrated by a polystyrene standard sample) obtained by measuring a 0.1% chloroform solution of a sample by GPC can be employed.

The addition amount of such a modified silicone compound is preferably, in view of obtaining sufficient addition effect, 1% by mass or more relative to the total cellulose resin composition and more preferably 2% by mass or more. In view of sufficiently ensuring properties of a cellulose resin such as strength and suppressing bleed out, the addition amount of a modified silicone compound is preferably 20% by mass or less and more preferably 10% by mass or less.

By adding such a modified silicone compound to a cellulose resin, the modified silicone compound having an appropriate particle diameter (for example, 0.1 to 100 μm) can be dispersed in the resin and the shock resistance of a resin composition can be improved.

As the shock resistance improver, a cardanol polymer containing cardanol as a main component may be used. Such a shock resistance improver has excellent compatibility with the cellulose resin of the exemplary embodiment and therefore a higher shock resistance improving effect can be obtained. Specific examples thereof include a cardanol polymer obtained by adding formaldehyde to cardanol and reacting this mixture with an unsaturated bond in the straight-chain hydrocarbon of cardanol; and a cardanol polymer obtained by adding a catalyst such as sulfuric acid, phosphoric acid or diethoxytrifluoroboron and reacting unsaturated bonds of the straight-chain hydrocarbon of cardanol with each other.

To the cellulose resin of the exemplary embodiment, if necessary, additives such as a colorant, an antioxidant and a heat stabilizer may be added as long as they are applied to conventional resin compositions.

To the cellulose resin of the exemplary embodiment, if necessary, a general thermoplastic resin may be added.

Particularly, by adding a thermoplastic resin having excellent flexibility such as a thermoplastic polyurethane elastomer (TPU), shock resistance can be improved. The addition amount of such a thermoplastic resin (particularly, TPU) is, in view of obtaining sufficient addition effect, preferably 1% by mass or more and more preferably 5% by mass or more relative to the total composition containing the cellulose resin of the exemplary embodiment (particularly, to the total amount of the cellulose resin and the thermoplastic resin (particularly, TPU)). In view of ensuring the properties of a cellulose resin such as strength and suppressing bleed out, the addition amount of thermoplastic resin is preferably 20% by mass or less and more preferably 15% by mass or less.

The thermoplastic polyurethane elastomer (TPU) suitable for improving shock resistance that can be used includes a polyurethane elastomer prepared by from a polyol, a diisocyanate and a chain extender.

Examples of the polyol include polyester polyol, polyester ether polyol, polycarbonate polyol and polyether polyol.

Examples of the polyester polyol include a polyester polyol obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a polyol such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,3-octane diol, 1,9-nonane diol, or a mixture of these; and a polylactone diol obtained by ring-opening polymerization of a lactone monomer such as ε-caprolactone.

Examples of the polyester ether polyol include a compound obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a glycol such as diethylene glycol or an alkylene oxide adduct (propylene oxide adduct etc.) or a mixture of these.

Examples of the polycarbonate polyol include a polycarbonate polyol obtained by reacting one or two or more polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol and diethylene glycol with diethylene carbonate, dimethyl carbonate, diethyl carbonate, etc.; and further may include a copolymer of a polycaprolactone polyol (PCL) and a polyhexamethylene carbonate (PHL).

Examples of the polyether polyol include a polyethylene glycol, polypropylene glycol and polytetramethylene ether glycol, each of which is obtained by polymerizing respective cyclic ethers: ethylene oxide, propylene oxide and tetrahydrofuran; and copolyethers of these.

Examples of the diisocyanate to be used in formation of TPU include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethyl xylene diisocyanate (TMXDI), 1,6,11-undecane triisocyanate, 1,8-diisocyanatemethyl octane, lysine ester triisocyanate, 1,3,6-hexamethylene triisocyanate, bicycloheptane triisocyanate and dicyclohexyl methane diisocyanate (hydrogenated MDI; HMDI). Of these, 4,4'-diphenylmethane diisocyanate (MDI) and 1,6-hexamethylene diisocyanate (HDI) are preferably used.

Examples of the chain extender to be used in formation of TPU, a low-molecular weight polyol can be used. Examples of the low-molecular weight polyol include aliphatic polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol, diethylene glycol and 1,4-cyclohexane dimethanol and glycerin; and aromatic glycols such as 1,4-dimethylolbenzene, bisphenol A and ethylene oxide or a propylene oxide adduct of bisphenol A.

When a silicone compound is copolymerized with a thermoplastic polyurethane elastomer (TPU) obtained from these materials, further excellent shock resistance can be obtained.

These thermoplastic polyurethane elastomers (TPU) may be used singly or in combination.

A method for producing a resin composition containing the cellulose resin of the exemplary embodiment, additives and a thermoplastic resin, is not particularly limited. For example, the resin composition can be produced by melting and mixing additives and the cellulose resin manually by handmixing or by use of a known mixer such as a tumbler mixer, a ribbon blender, a single-axial or a multiaxial mixing extruder, and a compounding apparatus such as a kneader and kneading roll and, if necessary, granulating the mixture into an appropriate shape. In another preferable process, additives dispersed in solvent such as an organic solvent and a resin are mixed and furthermore, if necessary, a coagulation solvent is added to obtain a mixed composition of the additives and the resin and thereafter, the solvent is evaporated.

The cellulose resin according to the exemplary embodiments mentioned above can be used as a base resin for a molding material. The molding material formed of a resin composition containing the cellulose resin as a base resin is suitable for forming housing such as packaging for an electronic device.

The base resin herein refers to a main component of a composition and means that other components may be contained as long as the components do not prevent the function of the main component. The content rate of the main component is not particularly limited; however, the content rate of the main component in a composition is preferably 50% by mass or more, more preferably 70% by mass or more, further preferably 80% by mass or more and particularly preferably 90% by mass or more.

EXAMPLES

The present invention will be more specifically described by way of examples below.

Synthesis Example 1

Cardanol Derivative 1 (Preparation of Chloridized and Succinic Acid-Modified Cardanol)

Hydrogenated cardanol (m-n-pentadecylphenol manufactured by ACROS Organics), in which an unsaturated bond(s) of the straight-chain hydrocarbon moiety of cardanol are hydrogenated, was used as a raw material. When the hydrogenated cardanol was measured by $^1$H-NMR (product name: AV-400, 400 MHz, manufactured by Bruker), no unsaturated bond was detected. Thus, it was confirmed that a hydrogenation rate is at least 90% by mole or more. The phenolic hydroxy group of the cardanol was reacted with succinic anhydride to add a carboxyl group to obtain carboxylated and hydrogenated cardanol. Next, the carboxyl group was converted into an acid chloride group by chloridizing it with oxalyl chloride to obtain chloridized and hydrogenated cardanol. More specifically, the chloridized and hydrogenated cardanol was prepared in accordance with the following procedure.

First, succinic anhydride (33 g (0.33 mol)) was dissolved in dehydrated chloroform (250 mL). To this, dehydrated pyridine (5.0 mL (0.062 mol)) and a raw material, i.e., hydrogenated cardanol (50 g (0.16 mol)) were added. The reaction solution was heated to reflux under a nitrogen atmosphere at 70° C. for 24 hours, cooled to room temperature. Thereafter, a crystal of succinic anhydride precipitated was separated by filtration. The chloroform solution filtrated was washed twice with 0.1 mol/L hydrochloric acid (250 mL) and further washed twice with water (250 mL). After washing, the chloroform solution was dehydrated with magnesium sulfate and magnesium sulfate was separated by filtration and chloroform was distilled away under reduced pressure to obtain a brown solid substance of carboxylated and hydrogenated cardanol (60 g (0.15 mol)).

The resultant carboxylated and hydrogenated cardanol (50 g (0.12 mol) was dissolved in dehydrated chloroform (250 mL). To this, oxalyl chloride (24 g (0.19 mol)) and N,N-dimethylformamide (0.25 mL (3.2 mmol)) were added. The reaction solution was stirred at room temperature for 72 hours. Chloroform, excessive oxalyl chloride and N,N-dimethylformamide were distilled away under reduced pressure to obtain chloridized and hydrogenated cardanol (52 g (0.12 mol).

Synthesis Example 2

Preparation of Abietic Acid Derivative

Hydrogenated abietic acid (trade name: Foral AX-E, manufactured by Eastman Chemical Company) was used as a raw material. When the hydrogenated abietic acid was measured by $^1$H-NMR (product name: AV-400, 400 MHz, manufactured by Bruker), no unsaturated bond was detected. Thus, it was confirmed that a hydrogenation rate was at least 90% by mole or more. The hydrogenated abietic acid (21 g (0.069 mol)) was dissolved in dehydrated chloroform (200 mL). To this, oxalyl chloride (13 g (0.11 mol)) and N,N-dimethylformamide (0.14 mL (1.8 mmol)) were added. The reaction solution was stirred at room temperature for 72 hours. Chloroform, excessive oxalyl chloride and N,N-dimethylformamide were distilled away under reduced pressure to obtain chloridized and hydrogenated abietic acid (22 g (0.068 mol)) in which a carboxyl group is converted into an acid chloride group.

Synthesis Example 3

Cardanol Derivative 2 (Preparation of Chloridized and Monochloroacetic Acid-Modified Cardanol)

Hydrogenated cardanol (m-n-pentadecylphenol manufactured by ACROS Organics), in which an unsaturated bond(s) of the straight-chain hydrocarbon moiety of cardanol are hydrogenated, was used as a raw material. The phenolic hydroxy group of the cardanol was reacted with monochloroacetic acid to add a carboxyl group to obtain carboxylated and hydrogenated cardanol. Next, the carboxyl group was converted into an acid chloride group by chloridizing it with oxalyl chloride to obtain chloridized and hydrogenated cardanol. More specifically, the chloridized and hydrogenated cardanol was prepared in accordance with the following procedure.

First, hydrogenated cardanol (80 g (0.26 mol)) was dissolved in methanol (120 mL). To this, an aqueous solution of sodium hydroxide (64 g (1.6 mol)) dissolved in distilled water (40 mL) was added. Thereafter, at room temperature, a solution of monochloro acetic acid (66 g (0.70 mol)) (manufactured by Kanto Chemical Co., Inc.) dissolved in methanol (50 mL) was added dropwise. After completion of the dropwise addition, the reaction solution was continuously stirred while refluxing at 73° C. for 4 hours. The reaction solution was cooled to room temperature and the reaction mixture was acidified with a diluted hydrochloric acid until pH became 1. To this, methanol (250 mL) and diethyl ether (500 mL) and further distilled water (200 mL) were added. The resultant water layer was separated by a separating funnel and discarded. The ether layer was washed twice with distilled water (400 mL). To the ether layer, magnesium anhydride was added to dry the ether layer and then separated by filtration. The filtrate (ether layer) was concentrated by an evaporator (90° C./3 mmHg) under reduced pressure to obtain a yellow brown powdery crude product as the residue. The crude product was recrystallized from n-hexane and dried under vacuum to obtain white powder of carboxylated and hydrogenated cardanol (46 g (0.12 mol)).

The resultant carboxylated and hydrogenated cardanol (46 g (0.12 mol)) was dissolved in dehydrated chloroform (250 mL). To this, oxalyl chloride (24 g (0.19 mol)) and N,N-dimethylformamide (0.25 mL (3.2 mmol) were added. The mixture was stirred at room temperature for 72 hours. Chloroform, excessive oxalyl chloride and N,N-dimethylformamide were distilled away under reduced pressure to obtain chloridized and hydrogenated cardanol (48 g (0.13 mol)).

Synthesis Example 4

Preparation of Biphenylacetyl Chloride

Biphenylacetic acid (6.0 g (0.028 mol)) manufactured by Sigma-Aldrich Co. LLC was dissolved in dehydrated chloroform (60 ml). To this, oxalyl chloride (3.7 g (0.029 mol)) and N,N-dimethylformamide (0.04 ml (0.51 mmol)) were added. The mixture was stirred at room temperature for 72 hours. Chloroform, excessive oxalyl chloride and N,N-dimethylformamide were distilled away under reduced pressure to obtain biphenylacetyl chloride (6.5 g (0.028 mol)).

Example 1

The chloridized and hydrogenated cardanol (cardanol derivative 1) prepared in Synthesis Example 1 and the chloridized and hydrogenated abietic acid (abietic acid derivative) prepared in Synthesis Example 2 were allowed to bind to cellulose acetate (trade name: LM-80, manufactured by Daicel Chemical Industries, Ltd., $DS_{Ace}$=2.1) to obtain grafted cellulose acetate. More specifically, the grafted cellulose acetate was prepared in accordance with the following procedure.

Cellulose acetate (20 g (hydroxy-group amount: 0.072 mol)) was dissolved in dehydrated dioxane (400 mL). To this, triethylamine (10.0 ml (0.072 mol)) was added as a reaction catalyst and an acid trapping agent. To the solution, a dioxane solution of the chloridized and hydrogenated abietic acid (21 g (0.065 mol)) of Synthesis Example 2 dissolved in dioxane (40 mL), was added. The reaction solution was heated to reflux at 100° C. for 5 hours. The reaction solution was slowly added dropwise to methanol (6 L) while stirring to allow reprecipitation. The resultant solid substance was separated by filtration, dried overnight in the air and further dried under vacuum at 105° C. for 5 hours to obtain hydrogenated abietic acid grafted cellulose acetate (22 g).

The hydrogenated abietic acid grafted cellulose acetate was measured by $^1$H-NMR (product name: AV-400, 400 MHz, manufactured by Bruker), and $DS_{Ab}$ was 0.10.

The hydrogenated abietic acid grafted cellulose acetate (10 g) was dissolved in dehydrated chloroform (200 mL). To this, triethylamine (2.5 mL (0.018 mol)) was added as a reaction catalyst and an acid trapping agent. To the solution, a chloroform solution of the chloridized and hydrogenated cardanol (20 g (0.049 mol)) of Synthesis Example 1 dissolved in chloroform (30 mL), was added. The reaction solution was heated to reflux at 70° C. for half-hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain hydrogenated cardanol and hydrogenated abietic acid grafted cellulose acetate (13 g).

The obtained sample (grafted cellulose acetate) was measured by $^1$H-NMR (product name: AV-400, 400 MHz, manufactured by Bruker), and $DS_{CD}$ was 0.45.

The sample was evaluated in the following procedure. The results are shown in Table 1A.

[Evaluation of Thermoplasticity (Press Moldability)]

Press molding was performed in the following conditions to obtain a compact. At that time, moldability was evaluated in accordance with the following criteria.

(Molding Conditions)

Temperature: 170° C., Time: 2 minutes, Pressure: 100 kgf ($9.8 \times 10^2$ N),

Size of compact: Thickness: 2 mm, Width: 13 mm, Length: 80 mm.

(Evaluation Criteria)

○: Good, Δ: not good (void, sink mark or partial uncharged portion was observed), x: cannot be molded.

[Measurement of Glass Transition Temperature (Heat Resistance Evaluation)]

Glass transition temperature was measured by DSC (product name: DSC6200, manufactured by Seiko Instruments Inc.).

[Bending Test]

The compact obtained by the aforementioned molding process was subjected to a bending test in accordance with JIS K7171.

[Tensile Test]

A solution of a sample (2 g) dissolved in chloroform (20 mL) was prepared. The solution was subjected to casting and a film of 10 mm in width, 60 mm in length and 0.2 mm in thickness was prepared by cutting out by a cutter knife. The film was subjected to a tensile test in accordance with JIS K7127.

[Measurement of Water Absorption Rate]

Water absorption rate was obtained by measurement in accordance with JIS K7209. More specifically, the compact was soaked in pure water for 24 hours at normal temperature. An increase of weight at this time was measured to obtain a weight increase rate.

[Determination of Plant-Component Ratio]

A cellulose component, a cardanol component and an abietic acid component were regarded as plant components. The total content rate (% by mass) of the plant components relative to the whole sample was obtained. Assuming that the cellulose component herein corresponds to that having a structure represented by Formula (1) above in which a hydroxy group is not acylated or grafted, and that the cardanol component corresponds to that having a structure represented by Formula (2) above, calculation was made.

Example 2

The chloridized and hydrogenated cardanol (cardanol derivative 1) prepared in Synthesis Example 1 and the chloridized and hydrogenated abietic acid (abietic acid derivative) prepared in Synthesis Example 2 were allowed to bind to cellulose acetate (trade name: LM-80, manufactured by Daicel Chemical Industries, Ltd., $DS_{Ace}$=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution of the chloridized and hydrogenated abietic acid (21 g (0.065 mol)) of Synthesis Example 2 dissolved in dioxane (20 mL), was added. The reaction solution was heated to reflux at 100° C. for 6 hours. The reaction solution was slowly added dropwise to methanol (6 L) while stirring to allow reprecipitation. The resultant solid substance was separated by filtration, dried overnight in the air and further dried under vacuum at 105° C. for 5 hours to obtain hydrogenated abietic acid grafted cellulose acetate (25 g).

The hydrogenated abietic acid grafted cellulose acetate was measured by $^1$H-NMR (product name: AV-400, 400 MHz, manufactured by Bruker), and $DS_{Ab}$ was 0.21.

The hydrogenated abietic acid grafted cellulose acetate (10 g) was dissolved in dehydrated chloroform (200 mL). To this, triethylamine (2.5 mL (0.018 mol)) was added as a reaction catalyst and an acid trapping agent. To the solution, a chloroform solution of the chloridized and hydrogenated cardanol (20 g (0.047 mol)) of Synthesis Example 1 dissolved in chloroform (30 mL), was added. The reaction solution was heated to reflux at 70° C. for half-hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain hydrogenated cardanol and hydrogenated abietic acid grafted cellulose acetate (13 g).

The obtained sample (grafted cellulose acetate) was measured by $^1$H-NMR (product name: AV-400, 400 MHz, manufactured by Bruker), and $DS_{CD}$ was 0.36.

The sample was evaluated in the same manner as in Example 1. The results are shown in Table 1A.

Example 3

The chloridized and hydrogenated cardanol (cardanol derivative 2) prepared in Synthesis Example 1 and the chloridized and hydrogenated abietic acid (abietic acid derivative) prepared in Synthesis Example 2 were allowed to bind to cellulose acetate (trade name: LM-80, manufactured by Daicel Chemical Industries, Ltd., $DS_{Ace}$=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution of the abietic acid derivative (21 g (0.065 mol)) of Synthesis Example 2 dissolved in dioxane (20 mL), was added. The reaction solution was heated to reflux at 100° C. for 12 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain hydrogenated abietic acid grafted cellulose acetate (13 g).

The hydrogenated abietic acid grafted cellulose acetate was measured by $^1$H-NMR (product name: AV-400, 400 MHz, manufactured by Bruker), and $DS_{Ab}$ was 0.32.

The hydrogenated abietic acid grafted cellulose acetate (10 g) was dissolved in dehydrated chloroform (200 mL). To this, triethylamine (2.5 mL (0.018 mol)) was added as a reaction catalyst and an acid trapping agent. To the solution, a chloroform solution of the cardanol derivative (20 g (0.047 mol)) of Synthesis Example 1 dissolved in chloroform (30 mL), was added. The reaction solution was heated to reflux at 70° C. for half-hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain hydrogenated cardanol and hydrogenated abietic acid grafted. cellulose acetate (21 g)

The obtained sample (grafted cellulose acetate) was measured by $^1$H-NMR (product name: AV-400, 400 MHz, manufactured by Bruker), and $DS_{CD}$ was 0.22.

The sample was evaluated in the same manner as in Example 1. The results are shown in Table 1A.

Example 4

The chloridized and hydrogenated cardanol (cardanol derivative 2) prepared in Synthesis Example 3 and the chloridized and hydrogenated abietic acid (abietic acid derivative) prepared in Synthesis Example 2 were allowed to bind to cellulose acetate (trade name: LM-80, manufactured by Daicel Chemical Industries, Ltd., $DS_{Ace}$=2.1) to obtain grafted cellulose acetate. More specifically, the grafted cellulose acetate was prepared in accordance with the following procedure.

The hydrogenated abietic acid grafted cellulose acetate (10 g) ($DS_{Ab}$=0.10, hydroxy-group amount: 0.029 mol) synthesized in Example 1 was dissolved in dehydrated chloroform (200 mL). To this, triethylamine (4.0 mL (0.029 mol)) was added as a reaction catalyst and an acid trapping agent. To the solution, a chloroform solution of the chloridized and hydrogenated cardanol (20 g (0.053 mol)) of Synthesis Example 3 dissolved in chloroform (30 mL), was added. The reaction solution was heated to reflux at 70° C. for half-hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain hydrogenated cardanol and hydrogenated abietic acid grafted cellulose acetate (13 g).

The obtained sample (grafted cellulose acetate) was measured by $^1$H-NMR (product name: AV-400, 400 MHz, manufactured by Bruker), and $DS_{CD}$ was 0.45.

The sample was evaluated in the same manner as in Example 1. The results are shown in Table 1A.

Example 5

The chloridized and hydrogenated cardanol (cardanol derivative 2) prepared in Synthesis Example 3 and the chloridized and hydrogenated abietic acid (abietic acid derivative) prepared in Synthesis Example 2 were allowed to bind to cellulose acetate (trade name: LM-80, manufactured by Daicel Chemical Industries, Ltd., $DS_{Ace}$=2.1) to obtain grafted cellulose acetate. More specifically, the grafted cellulose acetate was prepared in accordance with the following procedure.

The hydrogenated abietic acid grafted cellulose acetate (17 g) ($DS_{Ab}$=0.32, hydroxy-group amount: 0.029 mol) synthesized in Example 3 was dissolved in dehydrated chloroform (200 mL). To this, triethylamine (4.0 mL (0.029 mol)) was added as a reaction catalyst and an acid trapping agent. To the solution, a chloroform solution of the chloridized and hydrogenated cardanol (20 g (0.053 mol)) of Synthesis Example 3 dissolved in chloroform (30 mL), was added. The reaction solution was heated to reflux at 70° C. for half-hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain hydrogenated cardanol and hydrogenated abietic acid grafted cellulose acetate (21 g).

The obtained sample (grafted cellulose acetate) was measured by $^1$H-NMR (product name: AV-400, 400 MHz, manufactured by Bruker), and $DS_{CD}$ was 0.22.

The sample was evaluated in the same manner as in Example 1. The results are shown in Table 1A.

Example 6

The chloridized and hydrogenated cardanol (cardanol derivative 2) prepared in Synthesis Example 3 and the chloridized and hydrogenated abietic acid (abietic acid derivative) prepared in Synthesis Example 2 were allowed to bind to cellulose acetate (trade name: LM-80, manufactured by Daicel Chemical Industries, Ltd., $DS_{Ace}$=2.1) to obtain grafted cellulose acetate. More specifically, the grafted cellulose acetate was prepared in accordance with the following procedure.

The hydrogenated abietic acid grafted cellulose acetate (10 g) ($DS_{Ab}$=0.10, hydroxy-group amount: 0.029 mol) synthesized in Example 1 was dissolved in dehydrated chloroform (200 mL). To this, triethylamine (4.0 mL (0.029 mol)) was added as a reaction catalyst and an acid trapping agent. To the solution, a chloroform solution of the chloridized and hydrogenated cardanol (10 g (0.026 mol)) of Synthesis Example 3 dissolved in chloroform (30 mL) was added. The reaction solution was heated to reflux at 70° C. for half-hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain hydrogenated cardanol and hydrogenated abietic acid grafted cellulose acetate (13 g).

The obtained sample (grafted cellulose acetate) was measured by $^1$H-NMR (product name: AV-400, 400 MHz, manufactured by Bruker), and $DS_{CD}$ was 0.30.

The sample was evaluated in the same manner as in Example 1. The results are shown in Table 1A.

Example 7

The chloridized and hydrogenated cardanol (cardanol derivative 2) prepared in Synthesis Example 3 and the chloridized and hydrogenated abietic acid (abietic acid derivative) prepared in Synthesis Example 2 were allowed to bind to cellulose acetate (trade name: LM-80, manufactured by Daicel Chemical Industries, Ltd., $DS_{Ace}$=2.1) to obtain grafted cellulose acetate. More specifically, the grafted cellulose acetate was prepared in accordance with the following procedure.

The hydrogenated abietic acid grafted cellulose acetate synthesized in Example 2 (13 g ($DS_{Ab}$=0.21, hydroxy-group amount: 0.029 mol)) was dissolved in dehydrated chloroform (200 mL). To this, triethylamine (4.0 ml (0.029 mol)) was added as a reaction catalyst and an acid trapping agent. To the solution, a chloroform solution of the chloridized and hydrogenated cardanol (10 g (0.026 mol)) of Synthesis Example 3 dissolved in chloroform (30 mL), was added. The reaction solution was heated to reflux at 70° C. for 0.5 hours. The reaction solution was slowly added dropwise to methanol (3 L) while stirring to allow reprecipitation. The resultant solid substance was separated by filtration, dried overnight in the air and further dried under vacuum at 105° C. for 5 hours to hydrogenated cardanol and hydrogenated abietic acid grafted (20 g) obtain cellulose acetate.

The obtained sample (grafted cellulose acetate) was measured by $^1$H-NMR (product name: AV-400, 400 MHz, manufactured by Bruker), and $DS_{CD}$ was 0.19.

Furthermore, the sample was evaluated in the same manner as in Example 1. The results are shown in Table 1A.

Example 8

The chloridized and hydrogenated cardanol (cardanol derivative 2) prepared in Synthesis Example 3, chloridized and hydrogenated abietic acid (abietic acid derivative) prepared in Synthesis Example 2 and benzoyl chloride (BC) as a reactive hydrocarbon were allowed to bind to cellulose acetate (trade name: LM-80, manufactured by Daicel Chemical Industries, Ltd., $DS_{Ace}$=2.1) to obtain grafted cellulose acetate. More specifically, the grafted cellulose acetate was prepared in accordance with the following procedure.

The hydrogenated abietic acid grafted cellulose acetate (10 g) ($DS_{Ab}$=0.10, hydroxy-group amount: 0.029 mol) synthesized in Example 1 was dissolved in dehydrated chloroform (200 mL). To this, triethylamine (4.0 mL (0.029 mol)) was added as a reaction catalyst and an acid trapping agent. To the solution, a chloroform solution of the chloridized and hydrogenated cardanol (8.2 g (0.022 mol)) of Synthesis Example 3 and benzoyl chloride (BC) (5.6 g (0.040 mol)) manufactured by Tokyo Chemical Industry Co., Ltd. which were dissolved in chloroform (50 mL), was added. The reaction solution was heated to reflux at 70° C. for half-hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.20 and $DS_{BC}$ was 0.14.

The sample was evaluated in the same manner as in Example 1. The results are shown in Table 1B.

Example 9

The chloridized and hydrogenated cardanol (cardanol derivative 2) prepared in Synthesis Example 3, chloridized and hydrogenated abietic acid (abietic acid derivative) prepared in Synthesis Example 2 and phenylpropionyl chloride (PPA) as a reactive hydrocarbon were allowed to bind to cellulose acetate (trade name: LM-80, manufactured by Daicel Chemical Industries, Ltd., $DS_{Ace}$=2.1) to obtain grafted cellulose acetate. More specifically, the grafted cellulose acetate was prepared in accordance with the following procedure.

The hydrogenated abietic acid grafted cellulose acetate (10 g) ($DS_{Ab}$=0.10, hydroxy-group amount: 0.029 mol) synthesized in Example 1 was dissolved in dehydrated chloroform (200 mL). To this, triethylamine (4.0 mL (0.029 mol)) was added as a reaction catalyst and an acid trapping agent. To the solution, a chloroform solution of the chloridized and hydrogenated cardanol (15 g (0.039 mol)) of Synthesis Example 3 and phenylpropionyl chloride (PPA) (2.2 g (0.013 mol)) manufactured by Tokyo Chemical Industry Co., Ltd. which were dissolved in chloroform (50 mL), was added. The reaction solution was heated to reflux at 70° C. for half-hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.21 and $DS_{BAA}$ was 0.15.

The sample was evaluated in the same manner as in Example 1. The results are shown in Table 1B.

Example 10

The chloridized and hydrogenated cardanol (cardanol derivative 2) prepared in Synthesis Example 3, chloridized and hydrogenated abietic acid (abietic acid derivative) prepared in Synthesis Example 2 and cyclohexanecarboxylic acid chloride (CHC) as a reactive hydrocarbon were allowed to bind to cellulose acetate (trade name: LM-80, manufactured by Daicel Chemical Industries, Ltd., $DS_{Ace}$=2.1) to obtain grafted cellulose acetate. More specifically, the grafted cellulose acetate was prepared in accordance with the following procedure.

The hydrogenated abietic acid grafted cellulose acetate (10 g) ($DS_{Ab}$=0.10, hydroxy-group amount: 0.029 mol) synthesized in Example 1 was dissolved in dehydrated chloroform (200 mL). To this, triethylamine (4.0 mL (0.029 mol)) was added as a reaction catalyst and an acid trapping agent. To the solution, a chloroform solution of the chloridized and hydrogenated cardanol (11 g (0.029 mol)) of Synthesis Example 3 and cyclohexanecarboxylic acid chloride (CHC) (4.2 g (0.028 mol)) manufactured by Sigma Aldrich Japan which were dissolved in chloroform (50 mL), was added. The reaction solution was heated to reflux at 70° C. for half-hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.19 and $DS_{CHC}$ was 0.19.

The sample was evaluated in the same manner as in Example 1. The results are shown in Table 1B.

Example 11

The chloridized and hydrogenated cardanol (cardanol derivative 2) prepared in Synthesis Example 3, chloridized and hydrogenated abietic acid (abietic acid derivative) prepared in Synthesis Example 2 and biphenylacetic acid chloride (BAA) as a reactive hydrocarbon were allowed to bind to cellulose acetate (trade name: LM-80, manufactured by Daicel Chemical Industries, Ltd., $DS_{Ace}$=2.1) to obtain grafted cellulose acetate. More specifically, the grafted cellulose acetate was prepared in accordance with the following procedure.

The hydrogenated abietic acid grafted cellulose acetate (10 g) ($DS_{Ab}$=0.10, hydroxy-group amount: 0.029 mol) synthesized in Example 1 was dissolved in dehydrated chloroform (200 mL). To this, triethylamine (4.0 mL (0.029 mol)) was added as a reaction catalyst and an acid trapping agent. To the solution, a chloroform solution of the chloridized and hydrogenated cardanol (14 g (0.037 mol)) of Synthesis Example 3 and biphenylacetic acid chloride (BAA) (2.4 g (0.010 mol)) of Synthesis Example 4 which were dissolved in chloroform (50 mL), was added. The reaction solution was heated to reflux at 70° C. for half-hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.18 and $DS_{BAA}$ was 0.15.

The sample was evaluated in the same manner as in Example 1. The results are shown in Table 1B.

Example 12

The chloridized and hydrogenated cardanol (cardanol derivative 2) prepared in Synthesis Example 3, chloridized and hydrogenated abietic acid (abietic acid derivative) prepared in Synthesis Example 2 and biphenylcarbonyl chloride (BCC) as a reactive hydrocarbon were allowed to bind to cellulose acetate (trade name: LM-80, manufactured by Daicel Chemical Industries, Ltd., $DS_{Ace}$=2.1) to obtain grafted cellulose acetate. More specifically, the grafted cellulose acetate was prepared in accordance with the following procedure.

The hydrogenated abietic acid grafted cellulose acetate (10 g) ($DS_{Ab}$=0.10, hydroxy-group amount: 0.029 mol) synthesized in Example 1 was dissolved in dehydrated chloroform (200 mL). To this, triethylamine (4.0 mL (0.029 mol)) was added as a reaction catalyst and an acid trapping agent. To the solution, a chloroform solution of the chloridized and hydrogenated cardanol (9.2 g (0.024 mol)) of Synthesis Example 3 and biphenylcarbonyl chloride (BCC) (8.6 g (0.040 mol)) manufactured by Sigma Aldrich Japan which were dissolved in chloroform (50 mL), was added. The reaction solution was heated to reflux at 70° C. for half-hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.20 and $DS_{BCC}$ was 0.14.

The sample was evaluated in the same manner as in Example 1. The results are shown in Table 1B.

Example 13

The chloridized and hydrogenated cardanol (cardanol derivative 2) prepared in Synthesis Example 3 and chloridized and hydrogenated abietic acid (abietic acid derivative) prepared in Synthesis Example 2 were allowed to bind to cellulose acetate (trade name: LM-40, manufactured by Daicel Chemical Industries, Ltd., $DS_{Ace}$=2.4) to obtain grafted cellulose acetate. More specifically, the grafted cellulose acetate was prepared in accordance with the following procedure.

Cellulose acetate (20 g (hydroxy-group amount: 0.046 mol)) was dissolved in dehydrated dioxane (400 mL). To this, triethylamine (6.5 mL (0.047 mol)) was added as a reaction catalyst and an acid trapping agent. To the solution, a dioxane solution of the chloridized and hydrogenated abietic acid (21 g (0.065 mol)) of Synthesis Example 2 dissolved in dioxane (40 mL), was added. The reaction solution was heated to reflux at 100° C. for 5 hours. The reaction solution was slowly added dropwise to methanol (6 L) while stirring to allow reprecipitation. The resultant solid substance was separated by filtration, dried overnight in the air and further dried under vacuum at 105° C. for 5 hours to obtain hydrogenated abietic acid grafted cellulose acetate (22 g).

The hydrogenated abietic acid grafted cellulose acetate was measured by $^1$H-NMR (product name: AV-400, 400 MHz, manufactured by Bruker), and $DS_{Ab}$ was 0.10.

The hydrogenated abietic acid grafted cellulose acetate (17 g) (hydroxy-group amount: 0.029 mol) was dissolved in dehydrated chloroform (200 mL). To this, triethylamine (4.0 mL (0.029 mol)) was added as a reaction catalyst and an acid trapping agent. To the solution, a chloroform solution of the chloridized and hydrogenated cardanol (20 g (0.053 mol)) of Synthesis Example 3 dissolved in chloroform (30 mL), was added. The reaction solution was heated to reflux at 70° C. for half-hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain hydrogenated cardanol and hydrogenated abietic acid grafted cellulose acetate (24 g).

The obtained sample (grafted cellulose acetate) was measured by $^1$H-NMR (product name: AV-400, 400 MHz, manufactured by Bruker), and $DS_{CD}$ was 0.38.

The sample was evaluated in the same manner as in Example 1. The results are shown in Table 2.

Example 14

The chloridized and hydrogenated cardanol (cardanol derivative 2) prepared in Synthesis Example 3 and the chloridized and hydrogenated abietic acid (abietic acid derivative) prepared in Synthesis Example 2 were allowed to bind to cellulose acetate (trade name: LM-40, manufactured by Daicel Chemical Industries, Ltd., $DS_{Ace}$=2.4) to obtain grafted cellulose acetate. More specifically, the grafted cellulose acetate was prepared in accordance with the following procedure.

Cellulose acetate (20 g (hydroxy-group amount: 0.046 mol)) was dissolved in dehydrated dioxane (400 mL). To this, triethylamine (6.5 ml (0.047 mol)) was added as a reaction catalyst and an acid trapping agent. To the solution, a dioxane solution of the abietic acid derivative (42 g (0.13 mol)) of Synthesis Example 2 dissolved in dioxane (40 mL), was added. The reaction solution was heated to reflux at 100° C. for 12 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain hydrogenated abietic acid grafted cellulose acetate (27 g).

The hydrogenated abietic acid grafted cellulose acetate was measured by $^1$H-NMR (product name: AV-400, 400 MHz, manufactured by Bruker), and $DS_{Ab}$ was 0.32.

The hydrogenated abietic acid grafted cellulose acetate (37 g) (hydroxy-group amount: 0.029 mol) was dissolved in dehydrated chloroform (200 mL). To this, triethylamine (4.0 mL (0.029 mol)) was added as a reaction catalyst and an acid trapping agent. To the solution, a chloroform solution of the chloridized and hydrogenated cardanol (20 g (0.053 mol)) of Synthesis Example 3 dissolved in chloroform (30 mL), was added. The reaction solution was heated to reflux at 70° C. for half-hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain hydrogenated cardanol and hydrogenated abietic acid grafted cellulose acetate (42 g).

The obtained sample (grafted cellulose acetate) was measured by $^1$H-NMR (product name: AV-400, 400 MHz, manufactured by Bruker), and $DS_{CD}$ was 0.17.

The sample was evaluated in the same manner as in Example 1. The results are shown in Table 2.

Example 15

The chloridized and hydrogenated cardanol (cardanol derivative 2) prepared in Synthesis Example 3 and chloridized and hydrogenated abietic acid (abietic acid derivative) prepared in Synthesis Example 2 were allowed to bind to cellulose acetate butyrate (trade name: CAB-381-20, manufactured by Eastman Chemical Company, the number of acetic acid molecules molecules added to a single glucose unit of cellulose (degree of acetylation: $DS_{Ace}$)=1.0; the number of butyric acid molecules added to a single glucose unit of cellulose (degree of butyration: $DS_{Bu}$)=1.66) to obtain grafted cellulose acetate butyrate. More specifically, the grafted cellulose acetate butyrate was prepared in accordance with the following procedure.

Cellulose acetate butyrate (20 g (hydroxy-group amount: 0.021 mol)) was dissolved in dehydrated dioxane (400 mL). To this, triethylamine (3.1 mL (0.022 mol)) was added as a reaction catalyst and an acid trapping agent. To the solution, a dioxane solution of the chloridized and hydrogenated abietic acid (21 g (0.065 mol)) of Synthesis Example 2 dissolved in dioxane (40 mL), was added. The reaction solution was heated to reflux at 100° C. for 5 hours. The reaction solution was slowly added dropwise to methanol (6 L) while stirring to allow reprecipitation. The resultant solid substance was separated by filtration, dried overnight in the air and further dried under vacuum at 105° C. for 5 hours to obtain hydrogenated abietic acid grafted cellulose acetate butyrate (22 g).

The hydrogenated abietic acid grafted cellulose acetate butyrate was measured by $^1$H-NMR (product name: AV-400, 400 MHz, manufactured by Bruker), and $DS_{Ab}$ was 0.10.

The hydrogenated abietic acid grafted cellulose acetate butyrate (20 g (hydroxy-group amount: 0.014 mol)) was dissolved in dehydrated chloroform (200 mL). To this, triethylamine (2.5 mL (0.018 mol)) was added as a reaction catalyst and an acid trapping agent. To the solution, a chloroform solution (100 mL) dissolving the chloridized and hydrogenated cardanol (13 g (0.034 mol)) prepared in Synthesis Example 3 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate butyrate (24 g).

The obtained sample (grafted cellulose acetate butyrate) was measured by $^1$H-NMR (product name: AV-400, 400 MHz, manufactured by Bruker), and $DS_{CD}$ was 0.24.

The sample was evaluated in the same manner as in Example 1. The results are shown in Table 3.

Example 16

The chloridized and hydrogenated cardanol (cardanol derivative 2) prepared in Synthesis Example 3 and chloridized and hydrogenated abietic acid (abietic acid derivative) prepared in Synthesis Example 2 were allowed to bind to cellulose acetate propionate (trade name: CAP-482-20, manufactured by Eastman Chemical Company, the number of acetic acid molecules molecules added to a single glucose unit of cellulose (degree of acetylation: $DS_{Ace}$)=0.18; the number of propionic acid molecules added to a single glucose unit of cellulose (degree of propionation: $DS_{Pr}$)=2.49) to obtain grafted cellulose acetate propionate. More specifically, the grafted cellulose acetate propionate was prepared in accordance with the following procedure.

Cellulose acetate propionate (20 g (hydroxy-group amount: 0.021 mol)) was dissolved in dehydrated dioxane (400 mL). To this, triethylamine (3.1 ml (0.022 mol)) was added as a reaction catalyst and an acid trapping agent. To the solution, a dioxane solution of the chloridized and hydrogenated abietic acid (21 g (0.065 mol)) of Synthesis Example 2 dissolved in dioxane (40 mL), was added. The reaction solution was heated to reflux at 100° C. for 5 hours. The reaction solution was slowly added dropwise to methanol (6 L) while stirring to allow reprecipitation. The resultant solid substance was separated by filtration, dried overnight in the air and further dried under vacuum at 105° C. for 5 hours to obtain hydrogenated abietic acid grafted cellulose acetate propionate (22 g).

The hydrogenated abietic acid grafted cellulose acetate propionate was measured by $^1$H-NMR (product name: AV-400, 400 MHz, manufactured by Bruker), and $DS_{Ab}$ was 0.10.

The hydrogenated abietic acid grafted cellulose acetate propionate (20 g (hydroxy-group amount: 0.014 mol)) was dissolved in dehydrated chloroform (200 mL). To this, triethylamine (2.5 mL (0.018 mol)) was added as a reaction catalyst and an acid trapping agent. To the solution, a chloroform solution of the chloridized and hydrogenated cardanol (13 g (0.034 mol)) of Synthesis Example 3 dissolved in chloroform (100 mL) was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (24 g).

The obtained sample (grafted cellulose acetate butyrate) was measured by $^1$H-NMR (product name: AV-400, 400 MHz, manufactured by Bruker), and $DS_{CD}$ was 0.23.

The sample was evaluated in the same manner as in Example 1. The results are shown in Table 3.

Comparative Example 1

Cellulose acetate before grafting used in Example 1 was used as a comparative sample.

The cellulose acetate was evaluated in the same manner as in Example 1. The results are shown in Table 1B.

Note that the cellulose acetate did not melt even if heated and did not exhibit thermoplasticity. Furthermore, since the cellulose acetate could not be molded, a bending test was not performed.

Comparative Example 2

To cellulose acetate before grafting used in Example 1, triethyl citrate (trade name: Citroflex-2 manufactured by Pfizer Inc.) was added as a plasticizer such that the content became 45% by mass based on the whole resin composition. This was mixed by an extruder mixer (HAAKE MiniLab Rheomex extruder (Model CTW5, Thermo Electron Corp., Waltham, Mass.)) (at a temperature of 200° C. and a screw rotation speed of 60 rpm) to prepare a cellulose acetate resin composition.

The resin composition was evaluated in the same manner as in Example 1. The results are shown in Table 1B.

Note that when the resin composition was casted, a phase separation occurred and a uniform film could not be prepared. Thus, a tensile test was not performed.

Comparative Example 3

A cellulose acetate resin composition was prepared in accordance with the same content and manner as in Comparative Example 2 except that the addition amount of triethyl citrate was set to 56% by mass based on the whole resin composition.

The resin composition was evaluated in the same manner as in Example 1. The results are shown in Table 1B.

Note that when the resin composition was casted, a phase separation occurred and a uniform film could not be prepared. Thus, a tensile test was not performed.

Comparative Example 4

A cellulose acetate resin composition was prepared in accordance with the same content and manner as in Comparative Example 2 except that the addition amount of triethyl citrate was set to 34% by mass based on the whole resin composition.

The resin composition was evaluated in the same manner as in Example 1. The results are shown in Table 1B.

Note that when the resin composition was casted, a phase separation occurred and a uniform film could not be prepared. Thus, a tensile test was not performed.

Comparative Example 5

Cellulose acetate before grafting used in Example 13 was used as a comparative sample.

The cellulose acetate was evaluated in the same manner as in Example 1. The results are shown in Table 2.

Note that the cellulose acetate did not melt even if heated and did not exhibit thermoplasticity. Furthermore, since the cellulose acetate could not be molded, a bending test was not performed.

Comparative Example 6

To cellulose acetate before grafting used in Example 13, triethyl citrate (trade name: Citroflex-2 manufactured by Pfizer Inc.) was added as a plasticizer such that the content became 20% by mass based on the whole resin composition. This was mixed by an extruder mixer (HAAKE MiniLab Rheomex extruder (Model CTW5, Thermo Electron Corp., Waltham, Mass.)) (at a temperature of 190° C. and a screw rotation speed of 60 rpm) to prepare a cellulose acetate resin composition.

The resin composition was evaluated in the same manner as in Example 1. The results are shown in Table 2.

Note that when the resin composition was casted, a phase separation occurred and a uniform film could not be prepared. Thus, a tensile test was not performed.

Comparative Example 7

A cellulose acetate resin composition was prepared in accordance with the same content and manner as in Comparative Example 6 except that the addition amount of triethyl citrate was set to 40% by mass based on the whole resin composition.

The resin composition was evaluated in the same manner as in Example 1. The results are shown in Table 2.

Note that when the resin composition was casted, a phase separation occurred and a uniform film could not be prepared. Thus, a tensile test was not performed.

Comparative Examples 8 and 9

Cellulose acetate butyrate and cellulose acetate propionate before grafting used in Examples 15 and 16 were used as comparative samples, respectively.

The cellulose acetate butyrate and cellulose acetate propionate were evaluated in the same manner as in Example 1. The results are shown in Table 3.

Note that the cellulose acetate butyrate and cellulose acetate propionate melted when heated. They had thermoplasticity; however, melt viscosity was extremely large. Since it was difficult to normally mold them, a bending test was not performed.

Comparative Examples 10 and 11

To each of cellulose acetate butyrate and cellulose acetate propionate before grafting used in Examples 15 and 16, triethyl citrate (trade name: Citroflex-2 manufactured by Pfizer Inc.) was added as a plasticizer such that the content became 27% by mass based on the whole resin composition. This was mixed by an extruder mixer (HAAKE MiniLab Rheomex extruder (Model CTW5, Thermo Electron Corp., Waltham, Mass.)) at a temperature of 180° C. and a screw rotation speed of 60 rpm) to prepare a cellulose acetate butyrate resin composition and a cellulose acetate propionate resin composition.

The resin compositions were evaluated in the same manner as in Example 1. The results are shown in Table 3.

Note that when each of the resin compositions was casted, a phase separation occurred and a uniform film could not be prepared. Thus, a tensile test was not performed.

Reference Example 1

Chloridized and hydrogenated cardanol (cardanol derivative 1) prepared in Synthesis Example 1 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (23 g (0.054 mol)) prepared in Synthesis Example 1 was added. The reaction solution was heated to reflux at 100° C. for 6 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (16 g).

The obtained sample (grafted cellulose acetate) was measured by $^1$H-NMR (product name: AV-400, 400 MHz, manufactured by Bruker), and $DS_{CD}$ was 0.55.

The sample was evaluated in the same manner as in Example 1. The results are shown in Table 1B.

Reference Example 2

Chloridized and hydrogenated cardanol (cardanol derivative 2) prepared in Synthesis Example 3 was allowed to bind to cellulose acetate (trade name: LM-40, manufactured by Daicel Chemical Industries, Ltd., the number of acetic acid molecules added to a single glucose unit of cellulose (degree of acetylation: $DS_{Ace}$)=2.4) to obtain grafted cellulose acetate. More specifically, the grafted cellulose acetate was prepared in accordance with the following procedure.

Cellulose acetate (15.8 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution of the chloridized and hydrogenated cardanol (41.2 g (0.108 mol)) of Synthesis Example 3 dissolved in dioxane (100 mL), was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (25 g).

The obtained sample (grafted cellulose acetate) was measured by $^1$H-NMR (product name: AV-400, 400 MHz, manufactured by Bruker), and $DS_{CD}$ was 0.50.

The resin composition was evaluated in the same manner as in Example 1. The results are shown in Table 2.

Reference Example 3

Chloridized and hydrogenated cardanol (cardanol derivative 2) prepared in Synthesis Example 3 was allowed to bind to cellulose acetate butyrate (trade name: CAB-381-20, manufactured by Eastman Chemical Company) to obtain grafted cellulose acetate butyrate. More specifically, the grafted cellulose acetate butyrate was prepared in accordance with the following procedure.

Cellulose acetate butyrate (10 g (hydroxy-group amount: 0.011 mol)) was dissolved in dehydrated dioxane (200 mL). To this, triethylamine (2.5 mL (0.018 mol)) was added as a reaction catalyst and an acid trapping agent. To the solution, a dioxane solution (100 mL) dissolving the chloridized and hydrogenated cardanol (13 g (0.034 mol)) prepared in Synthesis Example 3 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate butyrate (13 g).

The obtained sample (grafted cellulose acetate butyrate) was measured by $^1$H-NMR (product name: AV-400, 400 MHz, manufactured by Bruker), and $DS_{CD}$ was 0.34.

The resin composition was evaluated in the same manner as in Example 1. The results are shown in Table 3.

Reference Example 4

Chloridized and hydrogenated cardanol (cardanol derivative 2) prepared in Synthesis Example 3 was allowed to bind to cellulose acetate propionate (trade name: CAP-482-20, manufactured by Eastman Chemical Company) to obtain grafted cellulose acetate propionate. More specifically, the grafted cellulose acetate propionate was prepared in accordance with the following procedure.

Cellulose acetate propionate (10 g (hydroxy-group amount: 0.010 mol)) was dissolved in dehydrated dioxane (200 mL). To this, triethylamine (2.5 mL (0.018 mol)) was added as a reaction catalyst and an acid trapping agent. To the solution, a dioxane solution (100 mL) dissolving the chloridized and hydrogenated cardanol (13 g (0.035 mol)) prepared in Synthesis Example 3 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (13 g).

The obtained sample (grafted cellulose acetate propionate) was measured by $^1$H-NMR (product name: AV-400, 400 MHz, manufactured by Bruker), and $DS_{CD}$ was 0.33.

The resin composition was evaluated in the same manner as in Example 1. The results are shown in Table 3.

TABLE 1A

| | | Example 1 | Example 2 | Example 3 | Example 4 | Example 5 | Example 6 | Example 7 |
|---|---|---|---|---|---|---|---|---|
| Amount of acetyl group | $DS_{Ace}$ | 2.1 | 2.1 | 2.1 | 2.1 | 2.1 | 2.1 | 2.1 |
| | Mass fraction (%) | 20 | 20 | 21 | 21 | 22 | 24 | 24 |
| Amount of cardanol derivative | $DS_{CD}$ modified with succinic acid | 0.45 | 0.36 | 0.22 | 0 | 0 | 0 | 0 |
| | $DS_{CD}$ modified with monochloro acetic acid | 0 | 0 | 0 | 0.45 | 0.22 | 0.30 | 0.19 |
| | Mass fraction (%) | 39 | 31 | 20 | 36 | 18 | 27 | 17 |
| Amount of abietic acid derivative | $DS_{Ab}$ | 0.10 | 0.21 | 0.32 | 0.10 | 0.32 | 0.10 | 0.21 |
| | Mass fraction (%) | 6 | 14 | 22 | 7 | 22 | 8 | 16 |
| Amount of reactive hydrocarbon compound | $DS_{XX}$ | 0 | 0 | 0 | 0 | 0 | 0 | 0 |
| | Mass fraction (%) | 0 | 0 | 0 | 0 | 0 | 0 | 0 |
| Addition amount of plasticizer (% by mass) | | 0 | 0 | 0 | 0 | 0 | 0 | 0 |
| Bending strength (MPa) | | 60 | 62 | 65 | 65 | 69 | 90 | 92 |
| Bending elastic modulus (GPa) | | 1.4 | 1.5 | 1.5 | 1.5 | 1.6 | 1.9 | 2.0 |
| Bend-breaking strain (%) | | >10 | >10 | >10 | >10 | >10 | >10 | >10 |

TABLE 1A-continued

|  | Example 1 | Example 2 | Example 3 | Example 4 | Example 5 | Example 6 | Example 7 |
|---|---|---|---|---|---|---|---|
| Tensile strength (MPa) | 45 | 47 | 49 | 48 | 51 | 60 | 62 |
| Tensile elastic modulus (GPa) | 1.1 | 1.1 | 1.1 | 1.1 | 1.1 | 1.7 | 1.7 |
| Tensile breaking strain (%) | 48 | 43 | 40 | 42 | 39 | 31 | 30 |
| Glass transition temperature (° C.) (heat resistance) | 125 | 127 | 130 | 134 | 143 | 150 | 153 |
| Thermoplasticity (press moldability) | ○ | ○ | ○ | ○ | ○ | ○ | ○ |
| Water absorption rate (%) | 1.3 | 1.3 | 1.2 | 1.1 | 1.0 | 1.6 | 1.5 |
| Plant component ratio (%) | 71 | 73 | 74 | 74 | 76 | 73 | 73 |

TABLE 1B

|  |  | Example 8 | Example 9 | Example 10 | Example 11 | Example 12 | Comparative Example 1 |
|---|---|---|---|---|---|---|---|
| Amount of acetyl group | $DS_{Ace}$ | 2.1 | 2.1 | 2.1 | 2.1 | 2.1 | 2.1 |
|  | Mass fraction (%) | 25 | 24 | 25 | 25 | 24 | 36 |
| Amount of cardanol derivative | $DS_{CD}$ modified with succinic acid | 0 | 0 | 0 | 0 | 0 | 0 |
|  | $DS_{CD}$ modified with monochloro acetic acid | 0.20 | 0.21 | 0.19 | 0.18 | 0.20 | 0 |
|  | Mass fraction (%) | 19 | 20 | 18 | 17 | 19 | 0 |
| Amount of abietic acid derivative | $DS_{Ab}$ | 0.10 | 0.10 | 0.10 | 0.10 | 0.10 | 0 |
|  | Mass fraction (%) | 8.0 | 7.8 | 7.9 | 7.9 | 7.8 | 0 |
| Amount of reactive hydrocarbon compound | $DS_{XX}$ | xx = BC 0.14 | xx = PPA 0.15 | xx = CHC 0.19 | xx = BAA 0.15 | xx = BCC 0.14 | 0 |
|  | Mass fraction (%) | 4.0 | 5.4 | 5.8 | 7.5 | 6.8 | 0 |
| Addition amount of plasticizer (% by mass) |  | 0 | 0 | 0 | 0 | 0 | 0 |
| Bending strength (MPa) |  | 124 | 83 | 98 | 116 | 105 | — |
| Bending elastic modulus (GPa) |  | 2.4 | 2.2 | 2.3 | 2.7 | 2.5 | — |
| Bend-breaking strain (%) |  | >10 | >10 | >10 | >10 | >10 | — |
| Tensile strength (MPa) |  | 75 | 64 | 67 | 71 | 69 | 60 |
| Tensile elastic modulus (GPa) |  | 1.7 | 1.3 | 1.3 | 1.9 | 1.6 | 2.3 |
| Tensile breaking strain (%) |  | 44 | 58 | 45 | 41 | 36 | 9.0 |
| Glass transition temperature (° C.) (heat resistance) |  | 160 | 146 | 153 | 154 | 158 | 227 |
| Thermoplasticity (press moldability) |  | ○ | ○ | ○ | ○ | ○ | x |
| Water absorption rate (%) |  | 1.1 | 1.2 | 1.4 | 0.85 | 1.4 | 17 |
| Plant component ratio (%) |  | 68 | 68 | 67 | 66 | 66 | 64 |

|  |  | Comparative Example 2 | Comparative Example 3 | Comparative Example 4 | Reference Example 1 |
|---|---|---|---|---|---|
| Amount of acetyl group | $DS_{Ace}$ | 2.1 | 2.1 | 2.1 | 2.1 |
|  | Mass fraction (%) | 20 | 16 | 24 | 20 |
| Amount of cardanol derivative | $DS_{CD}$ modified with succinic acid | 0 | 0 | 0 | 0.55 |
|  | $DS_{CD}$ modified with monochloro acetic acid | 0 | 0 | 0 | 0 |
|  | Mass fraction (%) | 0 | 0 | 0 | 46 |
| Amount of abietic acid derivative | $DS_{Ab}$ | 0 | 0 | 0 | 0 |
|  | Mass fraction (%) | 0 | 0 | 0 | 0 |
| Amount of reactive hydrocarbon compound | $DS_{XX}$ | 0 | 0 | 0 | 0 |
|  | Mass fraction (%) | 0 | 0 | 0 | 0 |
| Addition amount of plasticizer (% by mass) |  | 45 | 56 | 34 | 0 |
| Bending strength (MPa) |  | 15 | 11 | 24 | 48 |

TABLE 1B-continued

|  |  |  |  |  |
|---|---|---|---|---|
| Bending elastic modulus (GPa) | 0.41 | 0.29 | 0.72 | 1.1 |
| Bend-breaking strain (%) | >10 | >10 | >10 | >10 |
| Tensile strength (MPa) | — | — | — | 36 |
| Tensile elastic modulus (GPa) | — | — | — | 0.9 |
| Tensile breaking strain (%) | — | — | — | 55 |
| Glass transition temperature (° C.) (heat resistance) | 40 | 25 | 71 | 134 |
| Thermoplasticity (press moldability) | ○ | ○ | ○ | ○ |
| Water absorption rate (%) | 5.1 | 4.3 | 5.7 | 1.5 |
| Plant component ratio (%) | 35 | 28 | 42 | 70 |

TABLE 2

|  |  | Example 13 | Example 14 | Comparative Example 5 | Comparative Example 6 | Comparative Example 7 | Reference Example 2 |
|---|---|---|---|---|---|---|---|
| Amount of acetyl group | $DS_{Ace}$ | 2.4 | 2.4 | 2.4 | 2.4 | 2.4 | 2.4 |
|  | Mass fraction (%) | 24 | 25 | 39 | 31 | 24 | 24 |
| Amount of cardanol derivative | $DS_{CD}$ modified with monochloro acetic acid | 0.38 | 0.17 | 0 | 0 | 0 | 0.50 |
|  | Mass fraction (%) | 31 | 14 | 0 | 0 | 0 | 40 |
| Amount of abietic acid derivative | $DS_{Ab}$ | 0.10 | 0.32 | 0 | 0 | 0 | 0 |
|  | Mass fraction (%) | 6.8 | 22 | 0 | 0 | 0 | 0 |
| Addition amount of plasticizer (% by mass) |  | 0 | 0 | 0 | 20 | 40 | 0 |
| Bending strength (MPa) |  | 62 | 66 | — | 50 | 20 | 59 |
| Bending elastic modulus (GPa) |  | 1.5 | 1.6 | — | 2.3 | 0.80 | 1.5 |
| Bend-breaking strain (%) |  | >10 | >10 | — | >10 | >10 | >10 |
| Tensile strength (MPa) |  | 45 | 48 | 58 | — | — | 38 |
| Tensile elastic modulus (GPa) |  | 1.1 | 1.2 | 2.1 | — | — | 1.0 |
| Tensile breaking strain (%) |  | 45 | 41 | 11 | — | — | 53 |
| Glass transition temperature (° C.) (heat resistance) |  | 138 | 142 | 216 | 90 | 63 | 134 |
| Thermoplasticity (press moldability) |  | ○ | ○ | x | ○ | ○ | ○ |
| Water absorption rate (%) |  | 1.1 | 1.0 | 9.0 | 3.1 | 2.6 | 1.2 |
| Plant component ratio (%) |  | 66 | 73 | 61 | 49 | 36 | 71 |

TABLE 3

|  |  | Example 15 | Example 16 | Comparative Example 8 | Comparative Example 9 | Comparative Example 10 | Comparative Example 11 | Reference Example 3 | Reference Example 4 |
|---|---|---|---|---|---|---|---|---|---|
| Amount of acetyl group | $DS_{Ace}$ | 1.0 | 0.18 | 1.0 | 0.18 | 1.0 | 0.18 | 1.0 | 0.18 |
|  | Mass fraction (%) | 10 | 1.9 | 13 | 2.5 | 9.8 | 1.8 | 9.8 | 1.8 |
| Amount of butyryl/propionyl group | $DS_{Bu}$ or $DS_{Pr}$ | $DS_{Bu}$ 1.66 | $DS_{Pr}$ 2.49 | $DS_{Bu}$ 1.66 | $DS_{Pr}$ 2.49 | $DS_{Bu}$ 1.66 | $DS_{Pr}$ 2.49 | $DS_{Bu}$ 1.66 | $DS_{Pr}$ 2.49 |
|  | Mass fraction (%) | 27 | 34 | 37 | 46 | 27 | 34 | 27 | 27 |
| Amount of cardanol derivative | $DS_{CD}$ modified with monochloro acetic acid | 0.24 | 0.23 | 0 | 0 | 0 | 0 | 0.34 | 0.33 |
|  | Mass fraction (%) | 19 | 19 | 0 | 0 | 0 | 0 | 27 | 27 |
| Amount of abietic acid derivative | $DS_{Ab}$ | 0.10 | 0.10 | 0 | 0 | 0 | 0 | 0 | 0 |
|  | Mass fraction (%) | 6.7 | 6.9 | 0 | 0 | 0 | 0 | 0 | 0 |
| Addition amount of plasticizer (% by mass) |  | 0 | 0 | 0 | 0 | 27 | 27 | 0 | 0 |
| Bending strength (MPa) |  | 49 | 53 | — | — | 23 | 15 | 45 | 49 |
| Bending elastic modulus (GPa) |  | 1.4 | 1.5 | — | — | 0.79 | 0.82 | 1.3 | 1.4 |
| Bend-breaking strain (%) |  | >10 | >10 | — | — | >10 | >10 | >10 | >10 |
| Tensile strength (MPa) |  | 39 | 42 | 36 | 40 | — | — | 35 | 39 |
| Tensile elastic modulus (GPa) |  | 0.93 | 0.95 | 1.0 | 1.1 | — | — | 0.85 | 0.87 |
| Tensile breaking strain (%) |  | 91 | 88 | 55 | 52 | — | — | 100 | 98 |
| Glass transition temperature (° C.) (heat resistance) |  | 101 | 99 | 135 | 143 | 59 | 59 | 94 | 92 |

TABLE 3-continued

|  | Example 15 | Example 16 | Comparative Example 8 | Comparative Example 9 | Comparative Example 10 | Comparative Example 11 | Reference Example 3 | Reference Example 4 |
|---|---|---|---|---|---|---|---|---|
| Thermoplasticity (press moldability) | ○ | ○ | Δ | Δ | ○ | ○ | ○ | ○ |
| Water absorption rate (%) | 0.54 | 0.66 | 2.6 | 3.1 | 1.5 | 1.6 | 0.65 | 0.76 |
| Plant component ratio (%) | 60 | 61 | 50 | 52 | 36 | 38 | 60 | 61 |

When Examples 1 to 12 are compared to Comparative Example 1, the grafted cellulose resins of the examples each had thermoplasticity (press moldability) and excellent bending properties without reducing a plant component ratio, and further tensile properties (particularly, breaking strain (toughness, extension)) and water resistance (water absorption rate) were improved, compared to the cellulose derivative (cellulose acetate) before grafting which had no thermoplasticity. Furthermore, when Examples 1 to 12 are compared to Comparative Examples 2 to 4, the grafted cellulose resins of the examples were more improved in bending properties (bending strength, bending elastic modulus), tensile properties and water resistance than the cellulose derivatives before grafting which contained the plasticizer. In addition, high heat resistance (glass transition temperature) was obtained without reducing the plant component ratio.

In Examples 13 and 14 and Comparative Examples 5 to 7, compared to Examples 1 to 7 and Comparative Examples 2 to 4, the amount of acetyl group added to a cellulose hydroxy group is increased. Even in these case, when Examples 13 and 14 are compared to Comparative Example 5, the grafted cellulose resins of the examples each had thermoplasticity (press moldability) and excellent bending properties without reducing a plant component ratio, and further tensile properties (particularly, tensile breaking strain) and water resistance were improved, compared to the cellulose derivative before grafting which had no thermoplasticity. Furthermore, when Examples 13 and 14 are compared to Comparative Examples 6 and 7, the grafted cellulose resins of the examples were more improved in bending properties (particularly, bending strength, bending elastic modulus), tensile properties and water resistance than the cellulose derivatives before grafting which contained the plasticizer. In addition, high heat resistance was obtained without reducing the plant component ratio.

Examples 15 and 16 and Comparative Examples 8 to 11, each are an example of a cellulose resin prepared by using a cellulose derivative having not only an acetyl group but also a butyryl group or a propionyl group added to a hydroxy group. Even in these cases, when Examples 15 and 16 are compared to Comparative Examples 8 and 9, in the grafted cellulose resin of the examples, excellent thermoplasticity and bending properties were obtained without reducing the plant component ratio, and further tensile properties (particularly tensile breaking strain) and water resistance were improved; compared to the cellulose derivatives before grafting. Furthermore, when Examples 15 and 16 and Comparative Examples 10 and 11 are compared, the grafted cellulose resin of the examples were more improved in bending properties (bending strength, bending elastic modulus), tensile properties and water resistance than the cellulose derivatives before grafting which contained the plasticizer. In addition, high heat resistance was obtained without reducing the plant component ratio.

As described above, according to the examples, it is possible to provide a cellulose resin improved in water resistance and having good thermoplasticity (press moldability) and sufficient heat resistance while maintaining a high plant component ratio (high vegetism). Furthermore, a press compact having high bending properties can be obtained and a film compact can be improved in tensile properties (particularly, toughness). Furthermore, according to the examples, a grafted cellulose resin having a high plant component ratio as well as high utilization ratio of non-edible parts can be obtained.

When Examples 1 to 3 are compared to Reference Example 1, it was found that the grafted cellulose resins of the examples were improved in rigidity (bending strength, bending elastic modulus, tensile strength, tensile elasticity) and water resistance, compared to the cellulose resin in which a cardanol derivative was grafted but an abietic acid derivative was not grafted. Furthermore, it was found that the same effects were obtained when Example 13 and 14 are compared to Reference Example 2 and when Example 15 and 16 are compared to Reference Examples 3 to 4.

Having thus described the present invention with reference to the exemplary embodiments, the present invention is not limited to the above-described exemplary embodiments. Various modifications understandable to those skilled in the art may be made to the constitution and details of the present invention within the scope thereof.

This application claims the right of priority based on Japanese Patent Application No. 2009-231671 filed Oct. 5, 2009 and No. 2010-105513 filed Apr. 30, 2010, the entire content of which are incorporated herein by reference.

The invention claimed is:

1. A cellulose resin comprising a moiety of cellulose or a derivative thereof, a moiety of cardanol or a derivative thereof and a moiety of abietic acid or a derivative thereof,
   wherein the moiety of cardanol or a derivative thereof is linked to the moiety of cellulose or a derivative thereof via an organic linking group,
   a cellulose carbon atom to which a cellulose hydroxy group is bound and a cardanol carbon atom to which a phenolic hydroxy group of the cardanol or a derivative thereof is bound are linked via the organic linking group,
   the organic linking group comprises a first bond binding to the cellulose carbon atom wherein the first bond is an ester bond, and ether bond, or a urethane bond, and a second bond binding to the cardanol carbon atom wherein the second bond is an ester bond, an ether bond, or a urethane bond,
   wherein, when the first bond is an ester bond or a urethane bond, then the second bond is an ester bond, an ether bond, or a urethane bond,
   wherein, when the first bond is an ether bond, then the second bond is an ester bond or a urethane bond,
   at least one acyl group selected from a group consisting of an acetyl group, a propionyl group and a butyryl group is added to a cellulose hydroxy group of the cellulose or a derivative thereof,
   wherein a cellulose carbon atom to which a hydroxy group of the cellulose or a derivative thereof is bound, and an abietic acid carbon atom to which a carboxyl group of the abietic acid or a derivative thereof is bound are linked at least via a bond derived from the carboxyl group, and wherein the derivative of the abietic acid is a hydrogenated abietic acid obtained by hydrogenating an unsaturated bond of the abietic acid.

2. The cellulose resin according to claim 1, wherein:

a number of the cardanol molecules or derivatives thereof added to the cellulose or a derivative thereof per glucose unit, the number being abbreviated as $DS_{CD}$, is 0.05 or more, and a number of the abietic acid molecules or derivatives thereof added to the cellulose or a derivative thereof per glucose unit, the number being abbreviated as $DS_{AB}$, is 0.05 or more.

3. The cellulose resin according to claim 2, wherein a total number of the cardanol molecules or derivatives thereof and the abietic acid molecules or derivatives thereof added to the cellulose or a derivative thereof per glucose unit, the number being abbreviated as $DS_{Total}$, is 2.5 or less.

4. The cellulose resin according to claim 1, wherein a ratio of $DS_{Ab}$ to $DS_{CD}$ ($DS_{Ab}DS_{CD}$) is in the range of 5/95 to 95/5.

5. The cellulose resin according to claim 1, wherein an unsaturated bond of the cardanol or a derivative thereof is hydrogenated.

6. The cellulose resin according to claim 1, wherein the moiety of abietic acid or a derivative thereof is a moiety of a hydrogenated abietic acid obtained by hydrogenating an unsaturated bond of the abietic acid.

7. The cellulose resin according to claim 1, wherein the organic linking group comprises a divalent hydrocarbon group having 1 to 20 carbon atoms.

8. The cellulose resin according to claim 7, wherein:

the cellulose carbon atom and the hydrocarbon group are bound via an ester bond as the first bond, and the cardanol carbon atom and the hydrocarbon group are bound via an ester bond or an ether bond as the second bond.

9. The cellulose resin according to claim 1, wherein the bond derived from the carboxyl group is an ester bond.

10. The cellulose resin according to claim 1, wherein, to a cellulose hydroxy group of the cellulose or a derivative thereof, a reactive hydrocarbon compound comprising a functional group capable of reacting with the cellulose hydroxy group is added.

11. The cellulose resin according to claim 10, wherein the reactive hydrocarbon compound is a hydrocarbon compound comprising a carboxyl group, a carboxylic halide group or a carboxylic acid anhydride group.

12. The cellulose resin according to claim 10, wherein the reactive hydrocarbon compound is a monocarboxylic acid, an acid halide thereof or an acid anhydride thereof, the monocarboxylic acid being at least one selected from an aliphatic carboxylic acid, an aromatic carboxylic acid and an alicyclic carboxylic acid.

13. The cellulose resin according to claim 1, wherein, to a cellulose hydroxy group of the cellulose or a derivative thereof, at least one first acyl group selected from a group consisting of an acetyl group, a propionyl group and a butyryl group, and a second acyl group derived from at least one monocarboxylic acid selected from a group consisting of an aromatic carboxylic acid and an alicyclic carboxylic acid are each added; and a number of the second acyl groups added to the cellulose or a derivative thereof per glucose unit, the number being abbreviated as $DS_{XX}$, is 0.1 or more.

14. The cellulose resin according to claim 1, wherein, a number of remaining cellulose hydroxy groups per glucose unit, the number being abbreviated as $DS_{OH}$, is 0.9 or less.

15. The cellulose resin according to claim 1, wherein a total amount of the cellulose component, the cardanol component and the abietic acid component is 50% by mass or more, based on the total amount of the resin.

16. A molding material comprising a resin composition containing the cellulose resin as recited in claim 1 as a base resin.

17. The cellulose resin according to claim 1, wherein the first bond is an ester bond and the second bond is an ester bond or an ether bond.

18. The cellulose resin according to claim 1, wherein the first bond is an ester bond and the second bond is an ether bond.

19. The cellulose resin according to claim 1, wherein a number of the acyl groups added to a cellulose hydroxy group of the cellulose or a derivative thereof per glucose unit, the number being abbreviated as $DS_{AC}$, is 0.5 or more.

20. A resin composition comprising the cellulose resin as recited in claim 1 as a base resin.

* * * * *

UNITED STATES PATENT AND TRADEMARK OFFICE
CERTIFICATE OF CORRECTION

PATENT NO. : 8,962,778 B2
APPLICATION NO. : 13/500270
DATED : February 24, 2015
INVENTOR(S) : Iji et al.

It is certified that error appears in the above-identified patent and that said Letters Patent is hereby corrected as shown below:

In the specification

Column 4, Line 23 delete "teams" and insert -- terms --

Column 7, Line 29 delete "methacrylyl" and insert -- methacryloyl --

Column 7, Line 45 delete "foam" and insert -- form --

Column 11, Line 9 delete "16-hydroxyparmitic" and insert -- 16-hydroxypalmitic --

Column 11, Line 15 delete "16-aminoparmitic" and insert -- 16-aminopalmitic --

Column 31, Line 15 delete "molecules molecules" and insert -- molecules --

Column 31, Line 66 delete "molecules molecules" and insert -- molecules --

In the claims

Column 43, Line 13: Claim 2, delete "$DS_{AB}$," and insert -- $DS_{Ab}$, --

Column 43, Line 21: Claim 4, delete "$(DS_{Ab}DS_{CD})$" and insert -- $(DS_{Ab}/DS_{CD})$ --

Signed and Sealed this
Third Day of November, 2015

Michelle K. Lee
*Director of the United States Patent and Trademark Office*